United States Patent
Shaw

(10) Patent No.: US 7,789,424 B2
(45) Date of Patent: Sep. 7, 2010

(54) ALL TERRAIN VEHICLE SAFETY ATTACHMENT WITH GAS TANK HOLDER

(76) Inventor: Mark William Shaw, 3740 Pinewood Avenue, Prince George, BC (CA) V2M 4J4

( * ) Notice: Subject to any disclaimer, the term of this patent is extended or adjusted under 35 U.S.C. 154(b) by 6 days.

(21) Appl. No.: 12/385,883

(22) Filed: Apr. 22, 2009

(65) Prior Publication Data

US 2009/0206588 A1 Aug. 20, 2009

Related U.S. Application Data

(63) Continuation-in-part of application No. 11/881,765, filed on Jul. 30, 2007, now Pat. No. 7,665,766.

(51) Int. Cl.
*B62D 49/08* (2006.01)
(52) U.S. Cl. ................ 280/755; 180/311
(58) Field of Classification Search ........ 280/755; 180/311, 312, 208; 296/26.08
See application file for complete search history.

(56) References Cited

U.S. PATENT DOCUMENTS

| | | | |
|---|---|---|---|
| 4,522,420 A | 6/1985 | Hannappel | |
| 4,772,037 A | 9/1988 | Jones | |
| 4,798,399 A | 1/1989 | Cameron | |
| 4,815,756 A | 3/1989 | Kitner | |
| 4,886,294 A | 12/1989 | Nahachewski | |
| 4,973,082 A | 11/1990 | Kincheloe | |
| 5,174,622 A | 12/1992 | Gutta | |
| 5,765,871 A * | 6/1998 | Wyman et al. ........... 280/827 |
| 5,941,327 A * | 8/1999 | Wu ................... 180/65.1 |
| D417,647 S | 12/1999 | Jardine | |
| 6,336,517 B1 * | 1/2002 | Cheng ................ 180/208 |
| 6,425,510 B1 | 7/2002 | King | |
| 6,439,331 B1 * | 8/2002 | Fan .................. 180/208 |
| 6,543,830 B1 | 4/2003 | Stuck | |
| 6,609,481 B1 | 8/2003 | McCarty | |
| 6,655,717 B1 * | 12/2003 | Wang ................ 280/781 |
| 6,851,711 B2 * | 2/2005 | Goertzen et al. ...... 280/755 |
| 6,991,277 B1 * | 1/2006 | Esler ................. 296/50 |
| 7,044,249 B2 * | 5/2006 | Fan .................. 180/208 |
| 7,070,220 B1 * | 7/2006 | Lantaigne ........... 296/26.08 |
| 2005/0254925 A1 | 11/2005 | Braquet | |
| 2006/0096806 A1 | 5/2006 | Smith et al. | |

FOREIGN PATENT DOCUMENTS

WO     WO 03/042026    5/2003

* cited by examiner

*Primary Examiner*—Paul N Dickson
*Assistant Examiner*—Nicole Verley
(74) *Attorney, Agent, or Firm*—Richard C. Litman

(57) ABSTRACT

The all terrain vehicle safety attachment includes an adjustable frame having first and second frame portions. Upper ends of the first and second frame portions are pivotally secured to one another by a hinge or the like. The first and second frame portions are selectively, angularly adjustable with respect to one another. The first frame portion is secured to the back end of the all terrain vehicle, and a safety device is releasably and removably secured to the second frame portion. The safety device includes a pair of spaced apart, lower horizontal members. Each of the lower horizontal members has a front portion, a central portion and a rear portion. The rear portions thereof are angled upwardly so that the rear portions form a support base for the all terrain vehicle when a front end of the all terrain vehicle accidentally tips off the ground.

20 Claims, 26 Drawing Sheets

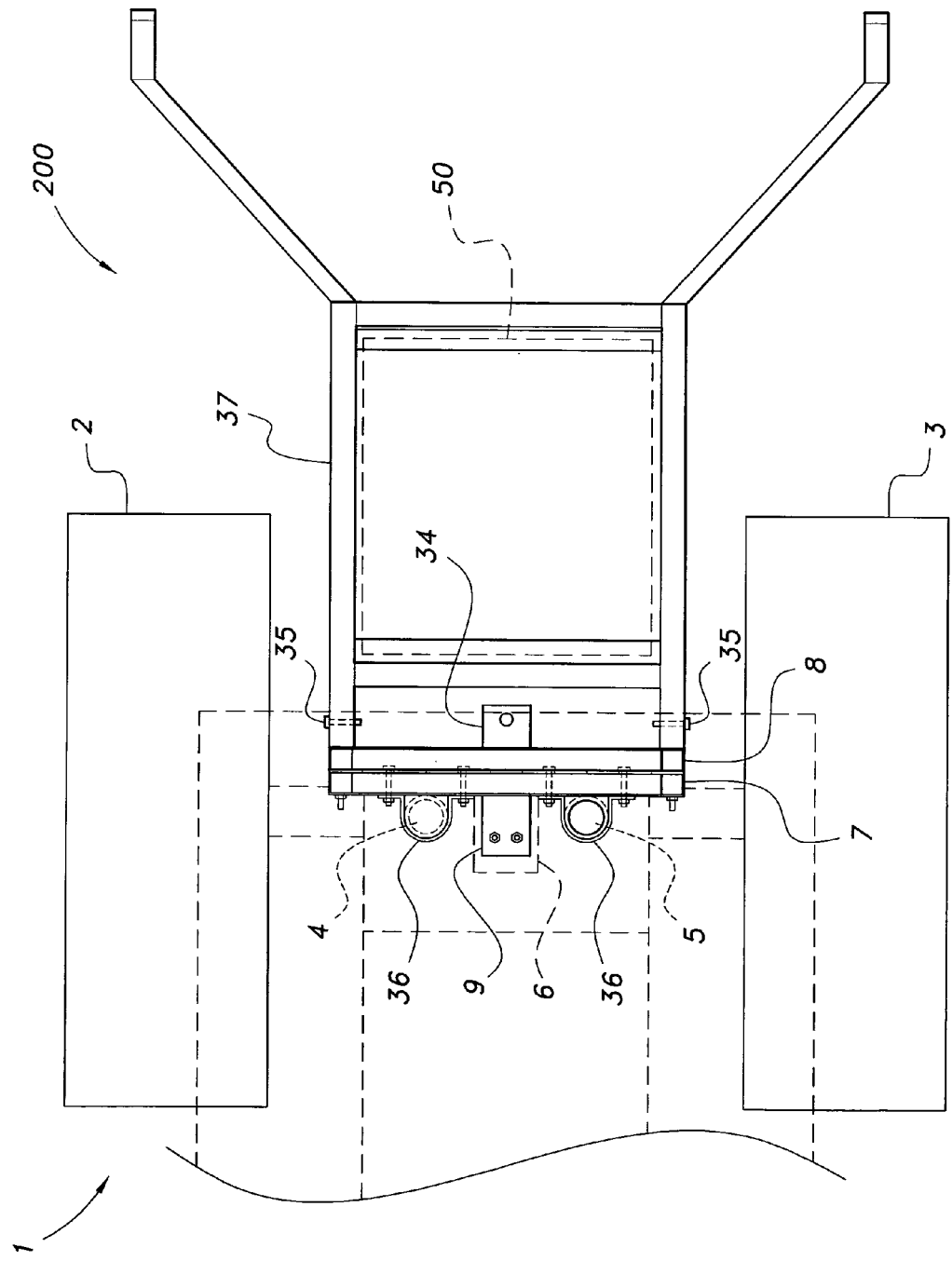

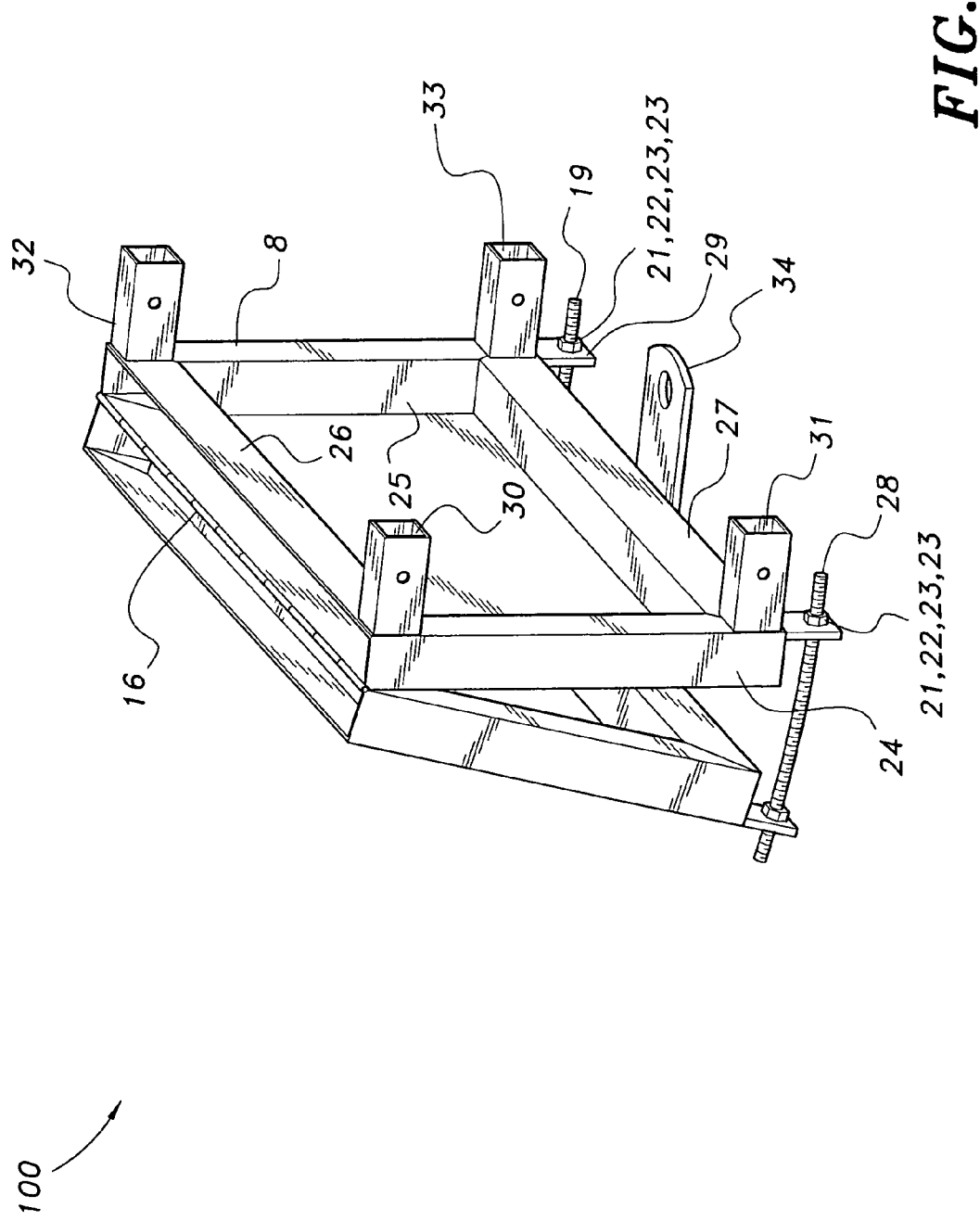

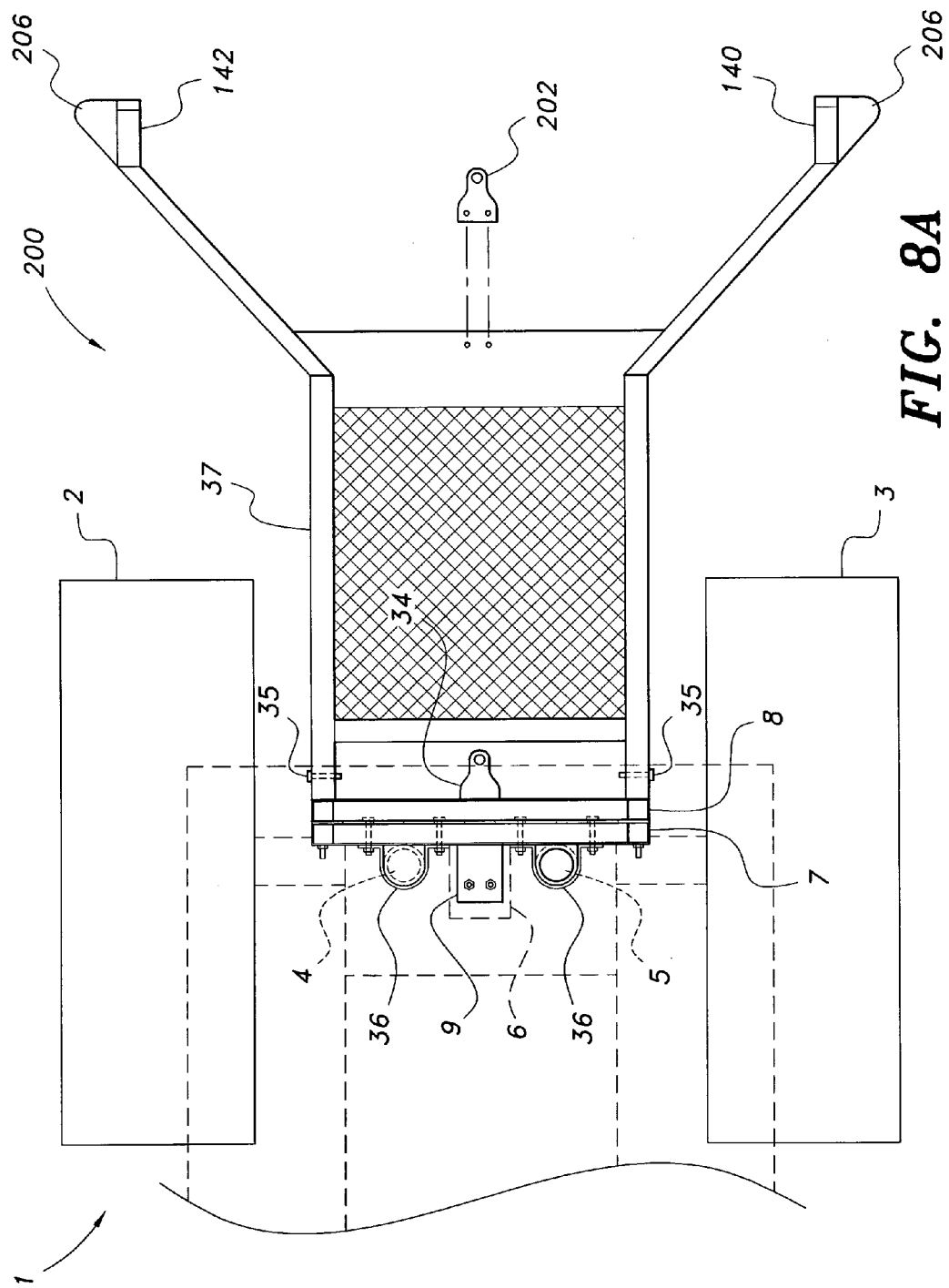

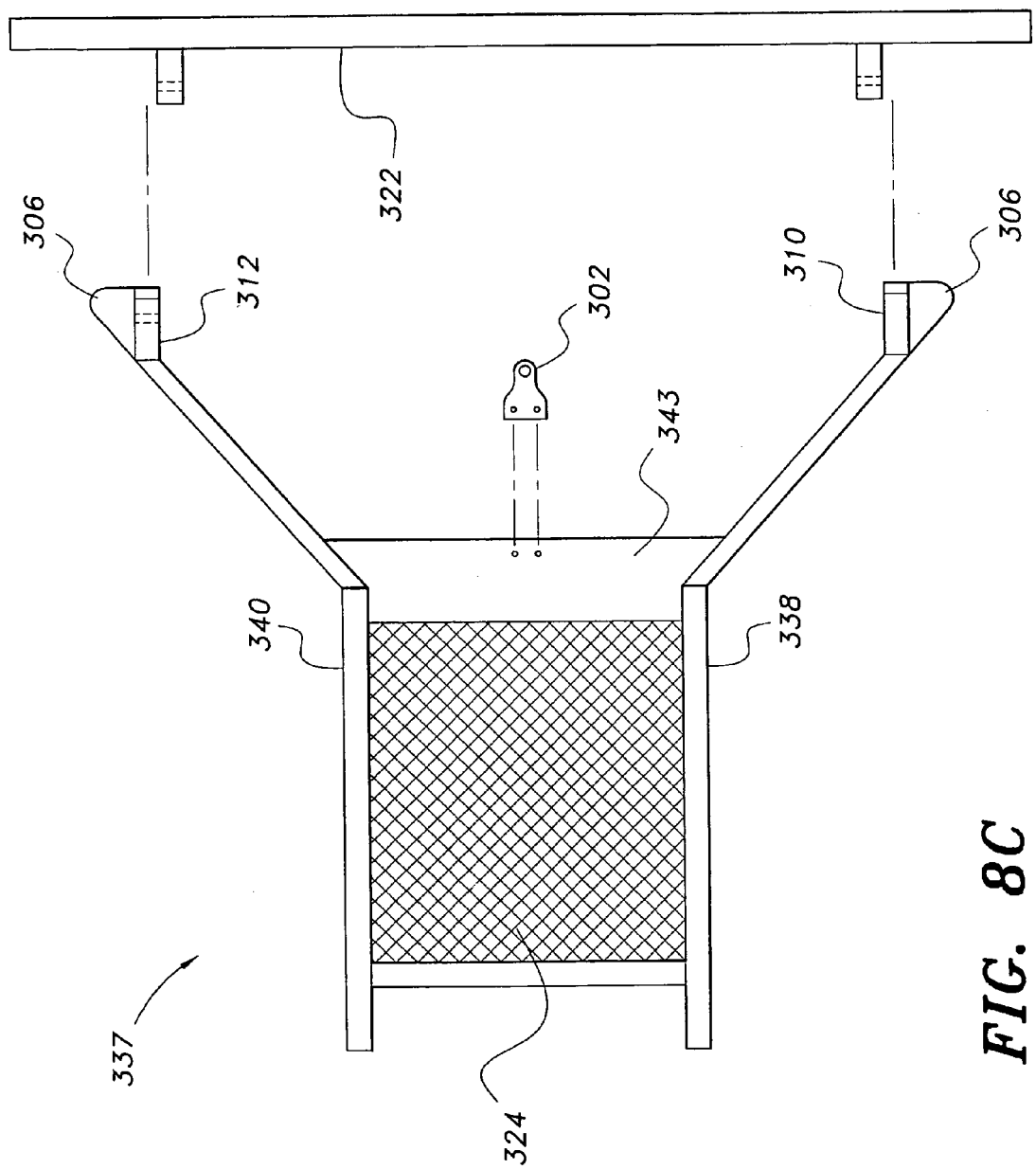

ALL TERRAIN VEHICLE SAFETY ATTACHMENT WITH GAS TANK HOLDER

CROSS-REFERENCE TO RELATED APPLICATIONS

This application is a continuation-in-part of U.S. patent application Ser. No. 11/881,765, filed Jul. 30, 2007 now U.S. Pat. No. 7,665,766.

BACKGROUND OF THE INVENTION

1. Field of the Invention

The present invention relates to accessories for all terrain vehicles (ATVs), utility terrain vehicles (UTVs) and the like, and particularly to an all terrain vehicle safety attachment with gas tank holder.

2. Description of the Related Art

All terrain vehicles are becoming, if not already are, one of the most popular leisure activity vehicles on the market, be it for riding trails, for enjoying the outdoors or for hunting. ATVs are also gaining popularity in their ability to aid the transportation of workers for their employment, whether to the job site or in the work assigned.

ATVs are often ridden in isolated areas, such as sand dunes, deserts, and mountain areas, and are operated by all ages, including young children as well as adults, even though there is usually a supplied warning that ATVs are not to be operated unless the driver is 16 years of age or older.

If ATVs are used for recreation, there are vast numbers of trails, and ATV enthusiasts often make their own additional trails. On such trails, the terrain is not always smooth and flat. There are many mountainous trails and a lot of short, up-and-down crevices in the trails, which create a definite hazard to the riders. The power of the ATVs exceeds the weight of the vehicles, and with this excessive power, the front end of the ATV invariably lifts off the ground. In some cases, a backward mishap occurs. When one person drives an ATV, that person is still at risk from the rugged terrain and also the power of the ATV. The experienced person uses his body weight to aid in the maneuvering on difficult terrain, but there is still the possibility of unexpected mishaps and, further, the terrain can change at a rapid pace, thus resulting in an upset where the front end leaves the ground and the ATV flips over backwards.

ATVs are designed for one person, however some people prefer one rider and one passenger, with both riding on the seat designed for one person. There are after-market back seats that are sold to make the ride for the passenger more comfortable, but these seats are typically pushed further back to the back wheelbase in order to accommodate a passenger. With the trails being steep and rugged, there is the risk of the ATV going over backwards, causing serious, if not fatal, injury to the rider and passenger. A passenger on the back with an after-market back seat is at even more risk than a passenger doubling on the existing seat because the passenger is positioned even further to the back of the ATV, making the front end even lighter when going up uneven terrain. The center of gravity in this situation is now moved close to the back wheels. There are presently ATVs on the market designed for two riders, but these too can flip over backwards in certain terrain.

If ATVs are used for hunting, the terrain to get to the game is typically uncharted and is often mountainous. Such a situation also presents the danger of the front end lifting up too high and tipping over backwards when one or two people are on the ATV. If ATVs are used for work, the danger is still present from the same problems that plague the leisure riders. There have been numerous accidents involving the ATVs' front ends lifting up too high off the ground and causing the ATV to tip over backwards, seriously injuring or killing the driver or the passenger. If ATVs are used for work purposes, in most instances, only one person on one machine is permitted.

In steep terrain, with one or two people on the ATV, it was discovered that limiting how far the vehicle's front end lifted off the ground is key to eliminating any threat of a backwards flip-over.

As noted above, all terrain vehicles are becoming so popular and common that these vehicles are used to their extremes in most instances; i.e., they are being used in all sorts of terrain, they are being used by more than one person at a time, and the power of these vehicles is becoming excessive. Combining the steepness of the hill or terrain with the weight of one or two people on the all terrain vehicle, and further considering the weight and the power of these vehicles, if the front end of the vehicle is allowed to lift too high off the ground, the possibility that the all terrain vehicle will have a backwards overturn is ever present. Thus, an all terrain vehicle safety attachment with gas tank holder solving the aforementioned problems is desired.

SUMMARY OF THE INVENTION

All terrain vehicles designed for one person are being used in a wide variety of different terrains and situations. When climbing a hill or incline, the center of gravity between the front wheels and the back wheels moves further back towards the back wheels due to the incline of the hill. This effect is enhanced by the driver's body sliding further backwards in the seat, or when a passenger is riding on the back.

All terrain vehicles designed for two people are not at as much risk as those described above, but as an incline or a steep hill is climbed, the center of gravity is also moved further towards the back wheels, whether from the driver and passenger sliding backwards or simply due to the steepness of the incline.

The all terrain vehicle safety attachment is for the prevention of the front wheels of an all terrain vehicle leaving the ground too an unsafe degree, thus preventing an accidental backwards overturn. The safety attachment includes two main components: an adjustable frame that is attached to the back end of the ATV and is permanently fixed thereto; and a removable safety device that can be attached before use, and then detached after each use, by the user or owner. A gasoline container can be carried within the housing of the safety device. Once the safety device is attached, the safety device is positioned parallel to the ATV, and the bottom of the safety device is in an approximate horizontal line with the center of the front and back wheels. The safety device clears the ground approximately the height of the radius of the wheels. The safety device can be adjusted upwards with an adjustment on the adjustable frame. This adjustment can be made either manually or by mechanical means.

This adjustment on the safety device gives more clearance on the trails when climbing up and down short steep hills, and also rough terrain. This adjustment can only be made until a safe factor is reached and the safety attachment performs its function, thus avoiding the ATV's front end from lifting off the ground too far.

The bottom outer members on the safety device are bent outwards, behind the housing compartment, for stability, and the ends are bent up so that when the ATV is backing up, the bent tips stop the safety device from digging into the ground, and also when the front end of the ATV lifts off the ground, the bent tips contact the ground and act as resting pads before the ATV drops back onto its wheels.

This safety attachment not only stops the ATV from having a backwards overturn, but it further eliminates the possibility of an overturn by limiting how far the front end lifts off the ground.

The safety attachment may be made of metal or some equivalent sturdy material. The all terrain vehicle safety attachment includes an adjustable frame having first and second frame portions, with the upper ends of the first and second frame portions being pivotally secured to one another. The first and second frame portions are selectively, angularly adjustable with respect to one another. Preferably, at least one curved bolt is received through openings formed through at least one plate secured to a lower edge of each of the first and second frame portions. Alternatively, the curved bolt may pass through bores formed directly through the lower ends of the first and second frame members.

The first frame portion is secured to the back end of the all terrain vehicle. Preferably, a connecting plate having at least one opening formed therethrough, is secured to a lower edge of the first frame portion, with the connecting plate being adapted for attachment to a mounting plate mounted on the back end of the vehicle.

A safety device is further provided, and is releasably attached to the second frame portion. The safety device includes a pair of spaced apart, lower horizontal members, with each of the lower horizontal members having a front portion, a central portion and a rear portion. The rear portions thereof are angled upwardly so that the rear portions form a support base for the vehicle when the front end of the vehicle accidentally tips off the ground.

Preferably, the front portions of the lower horizontal members are positioned parallel with respect to one another, the central portions thereof are angled outwardly, away from one another, and the rear portions thereof are positioned parallel with respect to one another and with respect to the front portions.

The safety device further includes a pair of upper horizontal members positioned above, and extending parallel with respect to, the pair of lower horizontal members. The pair of upper horizontal members and the pair of lower horizontal members define a space therebetween adapted for receiving a gasoline container. Front portions of the upper horizontal members and the front portions of the lower horizontal members are releasably secured to the second frame portion of the adjustable frame.

Additionally, the safety device further preferably includes a pair of lower crossmembers secured to and extending between the central portions of the lower horizontal members. A pair of upper crossmembers are aligned with the pair of lower crossmembers and are secured to, and extend between, the upper horizontal members.

The second frame portion preferably is substantially rectangular, defining four corners, and a connecting member is mounted to each corner and extends outwardly therefrom. The front portions of the upper horizontal members and the front portions of the lower horizontal members are, respectively, releasably secured to the connecting members of the second frame portion.

Additionally, at least one crossbeam is preferably mounted to, and extends across, the first frame portion. At least one attachment plate is secured to the at least one crossbeam. The at least one attachment plate is adapted for attachment about at least one vertical pipe mounted on the back end of the vehicle. It should be understood that the all terrain vehicle safety attachment may be used with other vehicles, such as UTVs, three-wheelers and the like.

These and other features of the present invention will become readily apparent upon further review of the following specification and drawings.

BRIEF DESCRIPTION OF THE DRAWINGS

FIG. 1A is a plan view of an all terrain vehicle safety attachment with gas tank holder according to the present invention, shown attached to the back end of an ATV.

FIG. 2C is a perspective view of side B of the adjustable frame of FIG. 2A.

FIG. 8A is a top view of an alternative embodiment of an all terrain vehicle safety attachment according to the present invention.

FIG. 8C is a bottom, partially exploded view of the safety attachment of FIG. 8B.

Similar reference characters denote corresponding features consistently throughout the attached drawings.

DETAILED DESCRIPTION OF THE PREFERRED EMBODIMENTS

Figure 1B:
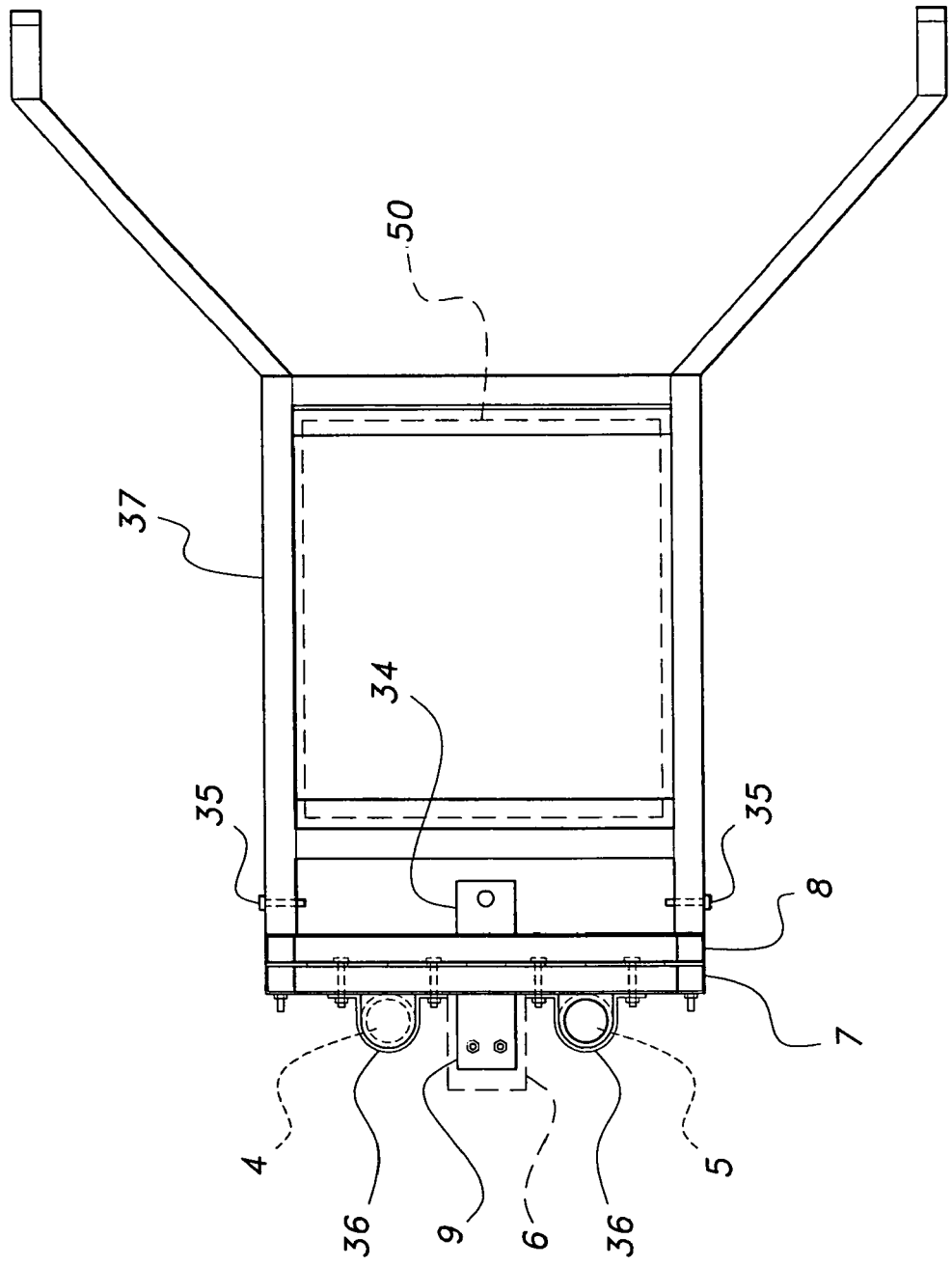
FIG. 1B is a plan view of the safety attachment of FIG. 1A, shown in use with a gasoline container connected to the two upright pipes and center trailer hitch plate on the ATV.

In the following, the safety attachment 200 is described with reference to two separate elements: a safety device 37 and an adjustable frame 100. Adjustable frame 100 is secured to the rear end of a vehicle (as will be described in detail below), and the safety device 37 is releasably secured to the adjustable frame 100, thus forming the overall safety attachment 200. FIG. 1A shows a plan view of the back end of a vehicle designated generally as 1. The vehicle 1 is generally referred to as an all terrain vehicle (ATV). The vehicle has a pair of rear wheels 2 and 3, respectively; the front end of the vehicle is not shown but typically has one or two wheels. The rear wheels generally have an axle that runs from one wheel to the other wheel, and the axle is enclosed within an axle housing. It should be noted that on some ATVs, the rear wheels do not have an axle that runs from one wheel to the other wheel. The rear wheels are on separate axles that connect into the transmission independently. There are many different makes and models of ATVs on the market, and the back end designs widely differ. It should be understood that the ATV shown in the Figures is shown for exemplary purposes only, and that the present invention may be applied to any type of vehicle, such as UTVs, three-wheelers and the like, as well as other ATVs having differently configured rear ends.

In the following, the safety attachment of the present invention will be described with respect to an exemplary ATV that has separate axles on the back end. On such an exemplary vehicle 1, as shown, there are two vertical pipes 4 and 5 that extend from the top of the lower frame on the ATV 1, then protrude vertically upwards and attach into the upper frame on the ATV. On the center of the lower frame, a plate 6 is welded thereto, and this plate 6 has two holes drilled through it. Plate 6 is where the trailer hitch bracket is bolted on at the factory. To attach the safety attachment onto the back end of an ATV, firstly you remove the trailer hitch bracket that is bolted onto plate 6. This is one of the points where the adjustable frame 7 and 8 attaches to the ATV. It should be noted that the two-piece frame is fixedly secured to the rear of the vehicle, thus retrofitting the original rear end (which typically includes a hitch).

Figure 2A:
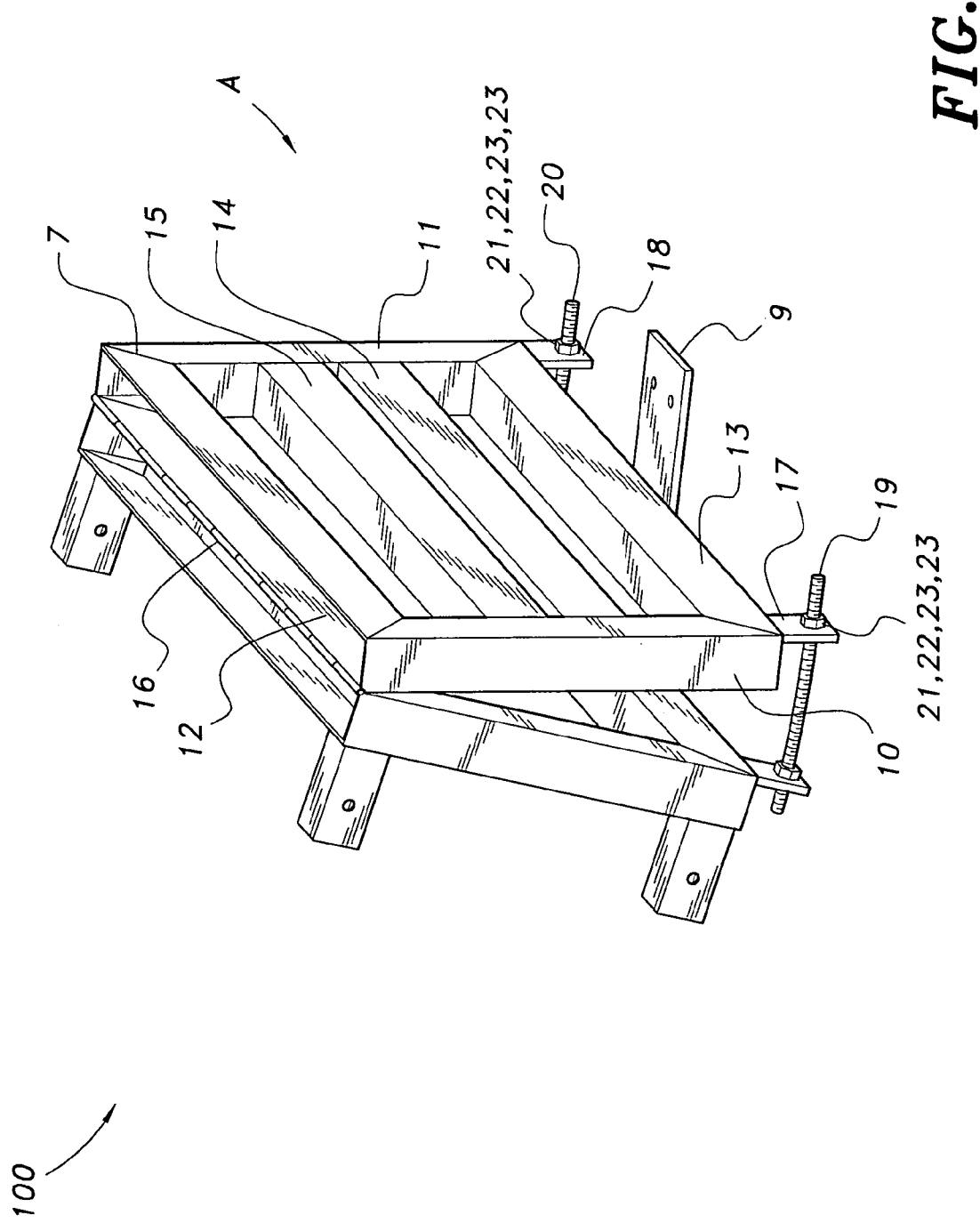
FIG. 2A is a perspective view of side A of the adjustable frame of an all terrain vehicle safety attachment with gas tank holder according to the present invention.

FIG. 2A shows a first side (designated side A) of frame 7 of the adjustable frame. Frame 7 includes two vertical members 10 and 11, which are connected at the top and bottom corners thereof, at 45-degree angles, by two horizontal members 12 and 13, also positioned at 45-degree angles, by welding or by other means of connecting some equivalent sturdy material. As shown, the planes of members 10, 11, 12 and 13 face inwardly, at an angle of approximately 45 degrees with respect to the vertical plane of the frame. Each of members 10, 11, 12 and 13 has a terminating end which is beveled at 45 degrees, and the intersection between adjacent members is at 45 degrees with respect to the horizontal, as shown. Members 10, 11 are positioned vertically, with members 12, 13 being positioned horizontally and extending perpendicular to members 10, 11. Within this rectangular frame, there are members 14 and 15 welded to the members 10 and 11, and extending horizontally across, as shown. The members 14 and 15 are positioned flush on either side with members 10 and 11. Members 14 and 15 are spaced apart so as to allow bolts to fit therebetween with some clearance allowance. As noted above, there are many makes and models of ATVs on the market, and side A of frame 7 may be modified in dimensions or contouring to fit to the different makes and models of ATVs and similar vehicles on the market.

FIG. 2A shows the bottom, outer side of member 13, with a plate 9 welded or bolted onto member 13 and projecting outwardly therefrom. It should be noted that there are two holes formed through plate 9, on the end farthest from member 13. These two holes in plate 9 will bolt onto the plate 6 on the back end of the ATV 1. A hinge 16 is welded or bolted to member 12 of frame 7, and also welded or bolted to member 26 of frame 8 (with reference to FIG. 2C, and to be described in detail below). The hinge 16 is welded or bolted on the top side of the frame to form one overall adjustable frame 100. On the bottom member 13 of frame 7, there are two plates 17 and 18, which are, welded flush to the outer faces of the outer ends of member 13, and a hole is drilled through each of these plates 17 and 18. A pair of relatively long, curved threaded bolts 19 and 20 pass through the plates 17 and 18. On either side of plates 17 and 18 a flat washer 21, lock washer 22 and double nuts 23 are attached onto the long curved threaded bolts 19, 20. It should be understood that the long curved bolts 19, 20 are shown for exemplary purposes only, and represent only one of the ways that the adjustable frame 100 can be selectively opened for more clearance on the trails, or selectively closed for less clearance on the trails. It should be understood that the frame may be attached to the rear of the vehicle via any suitable type of attachment.

FIG. 2C shows the opposite side of frame 100 (labeled side B in the Figures), with frame 8 facing outwardly. The frame 8 includes a pair of vertical members 24 and 25, which are connected at the top and bottom corners thereof at 45-degree angles by two horizontal members 26 and 27, also at 45-degree angles, by welding or by other means of connecting some equivalent sturdy material. Each of members 24, 25, 26 and 27 has a terminating end which is beveled at 45 degrees, and the intersection between adjacent members is at 45 degrees with respect to the horizontal, as shown. Members 24, 25 are positioned vertically, with members 26, 27 being positioned horizontally and extending perpendicular to members 24, 25. The hinge 16 is attached to member 26 on frame 8, and also on the corresponding member 12 on frame 7, by welding, bolting or the like. On the bottom outer ends of member 27, there are two plates 28 and 29, and these plates 28 and 29 are attached by welding or the like to member 27, and a hole is drilled through each of these plates to receive the other ends of the relatively long, curved bolts 19 and 20.

The long, curved threaded bolts 19 and 20 pass through side of plates 28 and 29, and on either side of plates 28 and 29, there is a flat washer 21, lock washer 22 and double nuts 23. Also on member 27, on the bottom end thereof, and positioned centrally, there is a plate 34 with a hole drilled through it of sufficient size to fit a trailer hitch ball. This plate 34 is welded securely to member 27. Once the adjustable frame 100 is attached to the ATV 1, plate 34 will be the new location to attach a ball for a trailer hitch when the ATV 1 is pulling a load. When attached, frame 7 faces the ATV 1, and frame 8 faces away from the ATV.

Figure 1C:
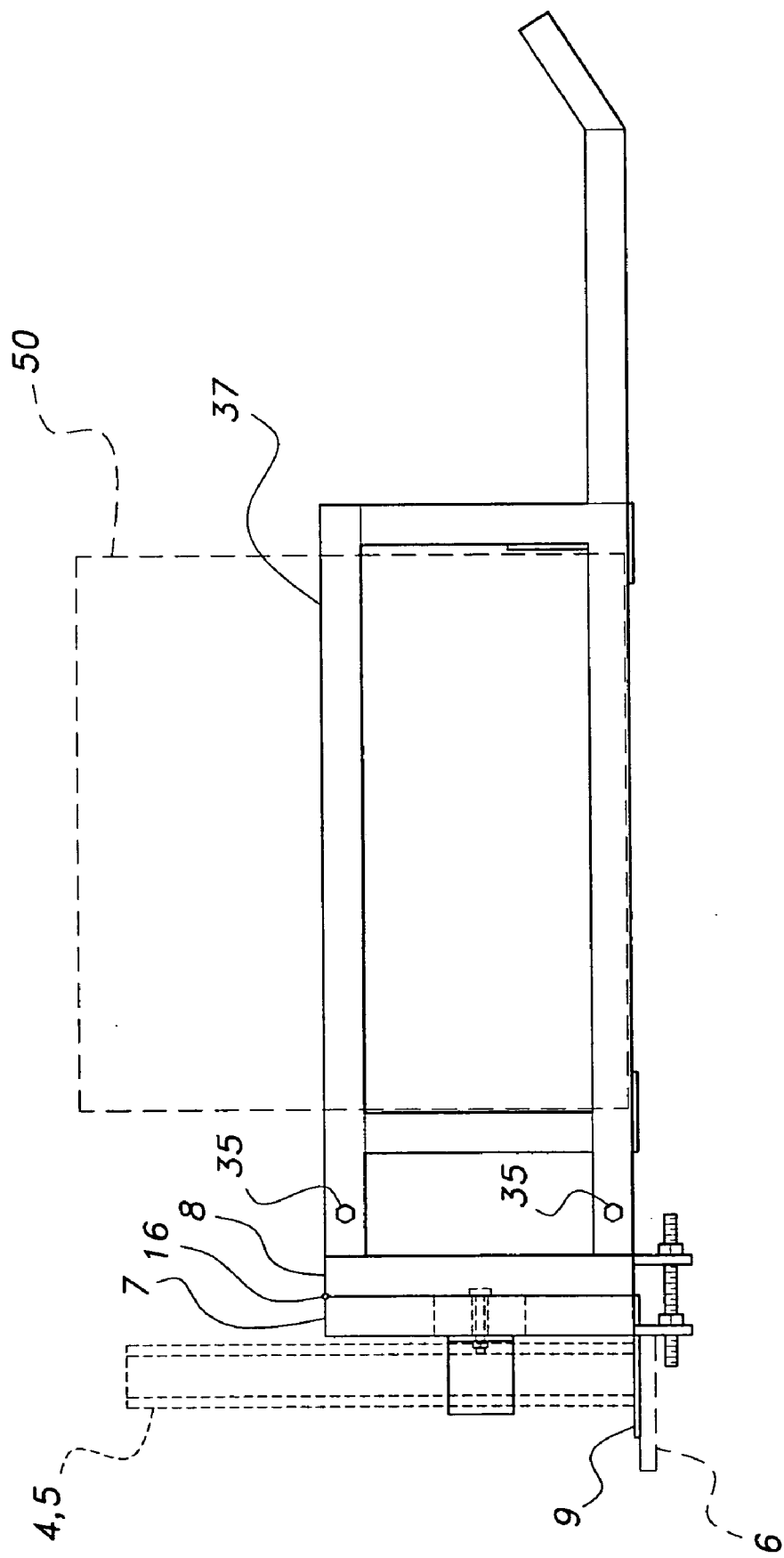
FIG. 1C is an elevation view of the safety attachment of FIG. 1A, shown combined with the gasoline container connected to the two upright pipes and the center trailer hitch plate on the ATV.
Figure 2B:
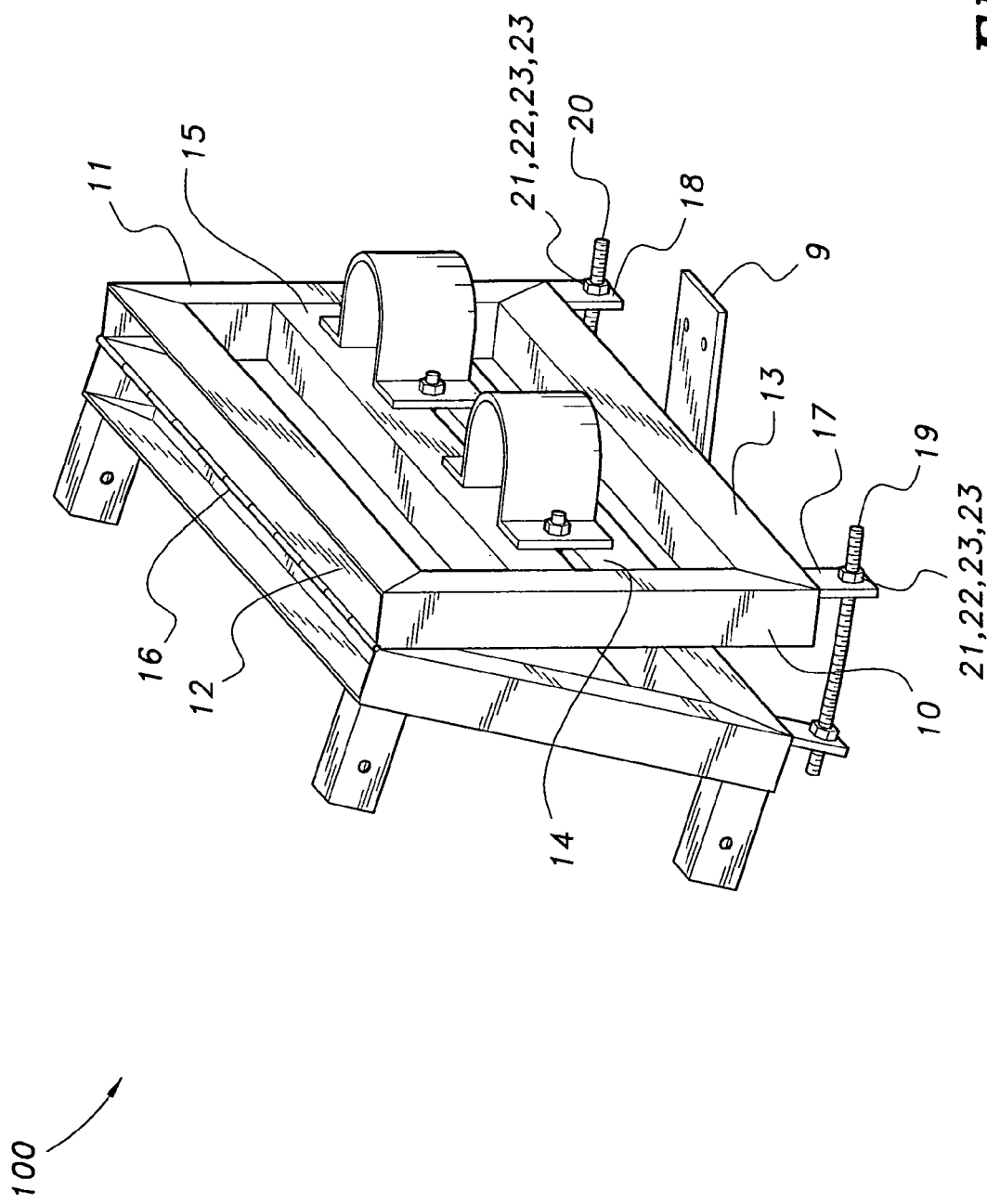
FIG. 2B is a perspective view of side A of the adjustable frame of FIG. 2A, showing the connection plates that attach around the two vertical pipes on the ATV and then attach onto side A of the adjustable frame.
Figure 2D:
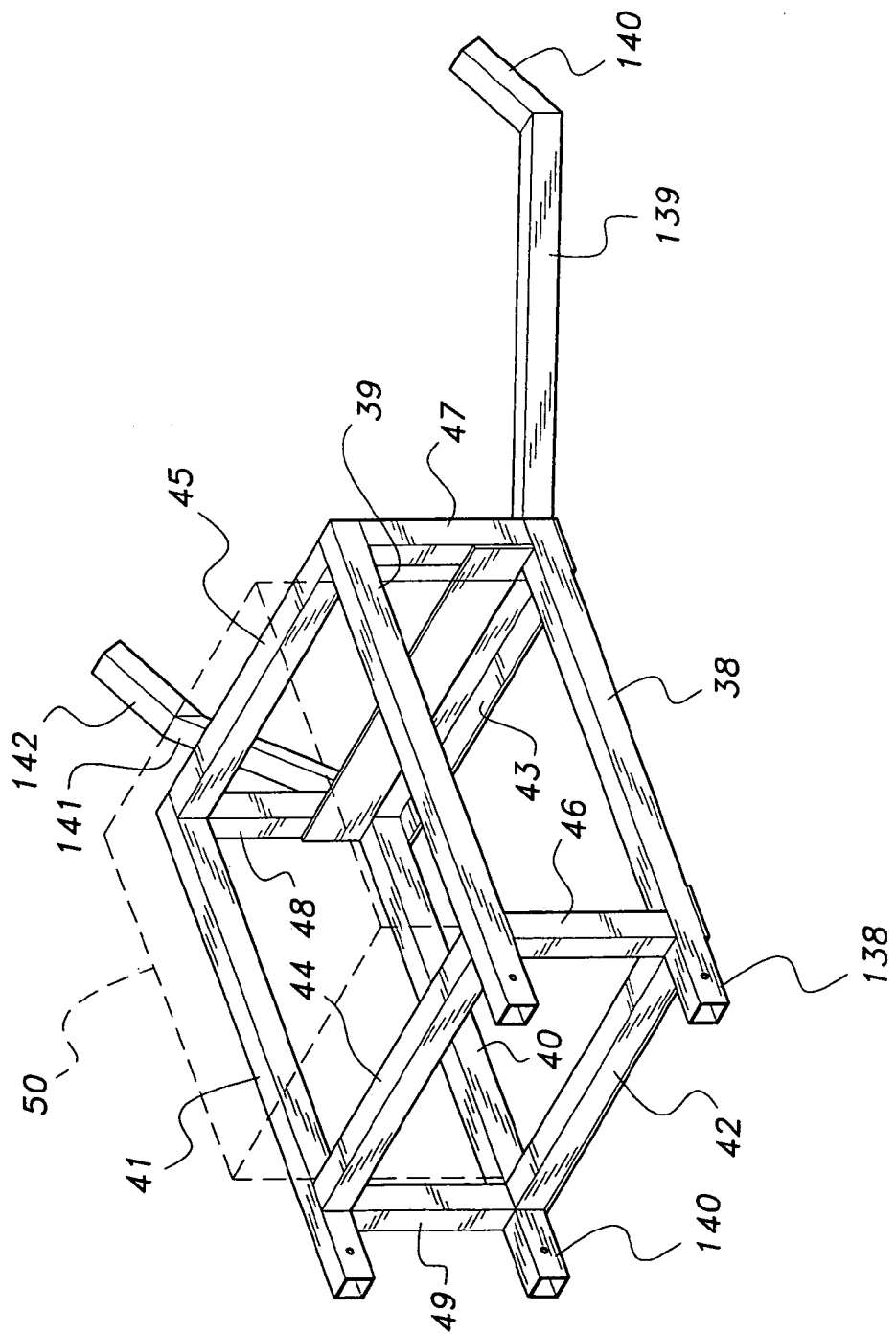
FIG. 2D is a perspective view of the safety device of FIG. 1, shown with a gasoline container placed within the housing.
Figure 2E:
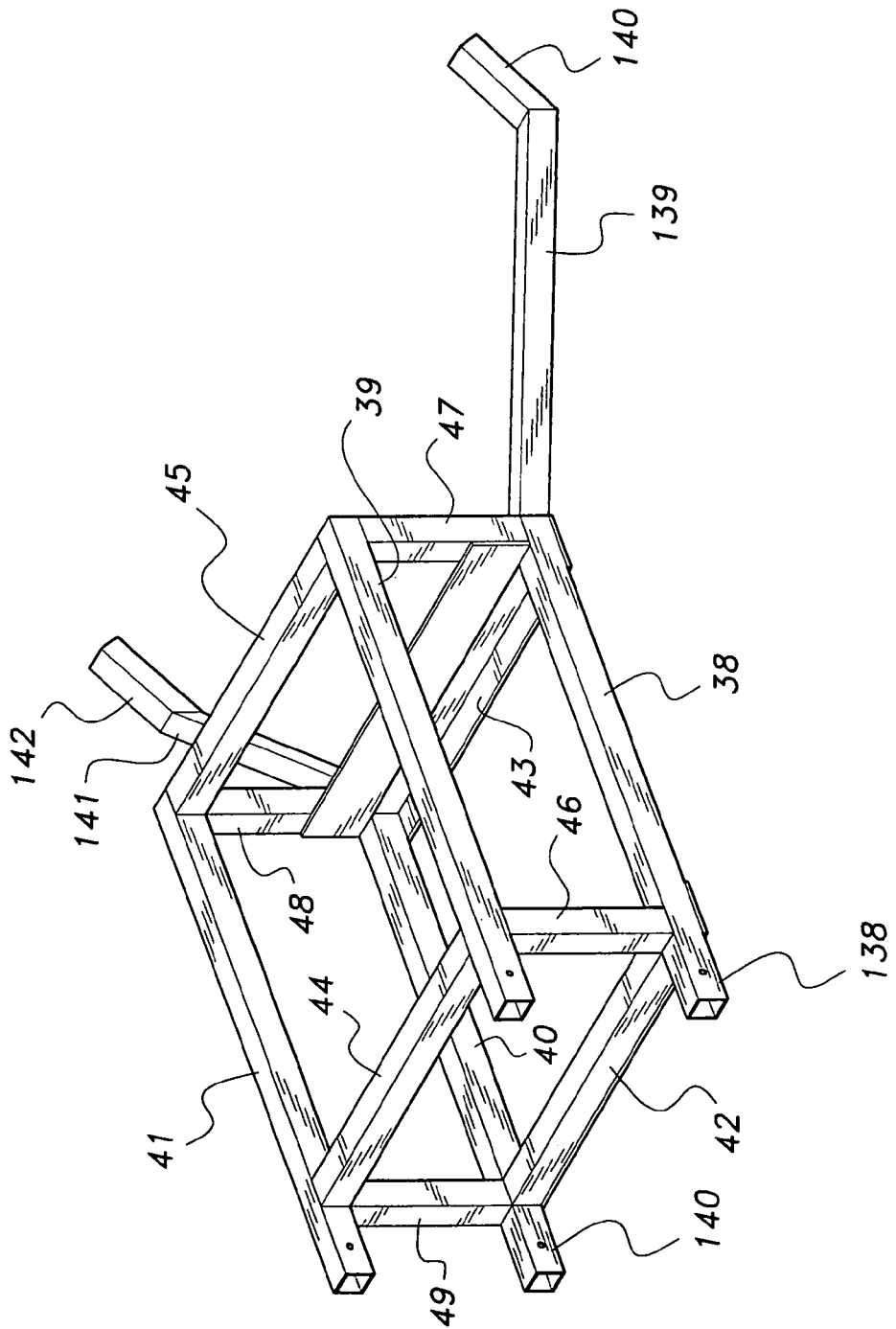
FIG. 2E is another perspective view of the safety device of FIG. 1.
Figure 2F:
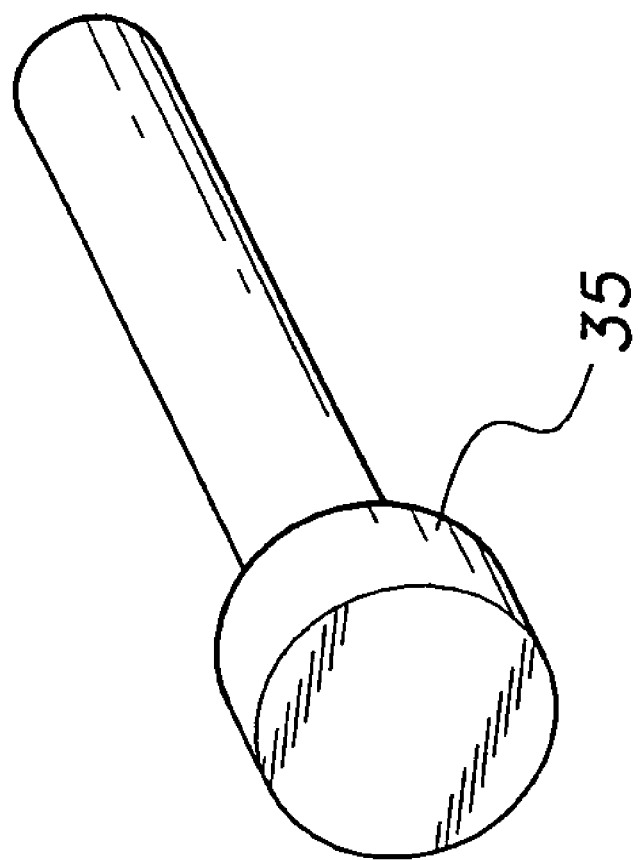
FIG. 2F is a side view of a locking pin for an all terrain vehicle safety attachment with gas tank holder according to the present invention.

There are four connection members 30, 31, 32, 33 that are welded at a perpendicular angle to members 24, 25, 26 and 27 at the four corners of frame 8. A hole is drilled through each of the four connection members 30, 31, 32, 33. FIG. 1A, FIG. 1B and FIG. 1C illustrate the safety device 37 (shown in FIG. 2D) sliding onto these four connection members 30, 31, 32, 33. Particularly, member 41 of safety device 37 attaches to member 32, member 39 of safety device 37 attaches to member 30, member 40 of safety device 37 attaches to member 33, and member 38 of safety device 37 attaches to member 31. FIG. 2F illustrates a locking pin 35, and in FIG. 1A, FIG. 1B and FIG. 1C, four such locking pins 35 are inserted through the safety device 37 and through the four connection members 30, 31, 32, 33 on frame 8 (i.e., locking pins 35 pass through holes formed through each of members 38, 39, 40, 41 and respective members 30, 31, 32, 33, thus securing the safety device to frame 8 and the overall adjustable frame 100, which is secured to the rear end of the ATV 1).

Figure 2G:
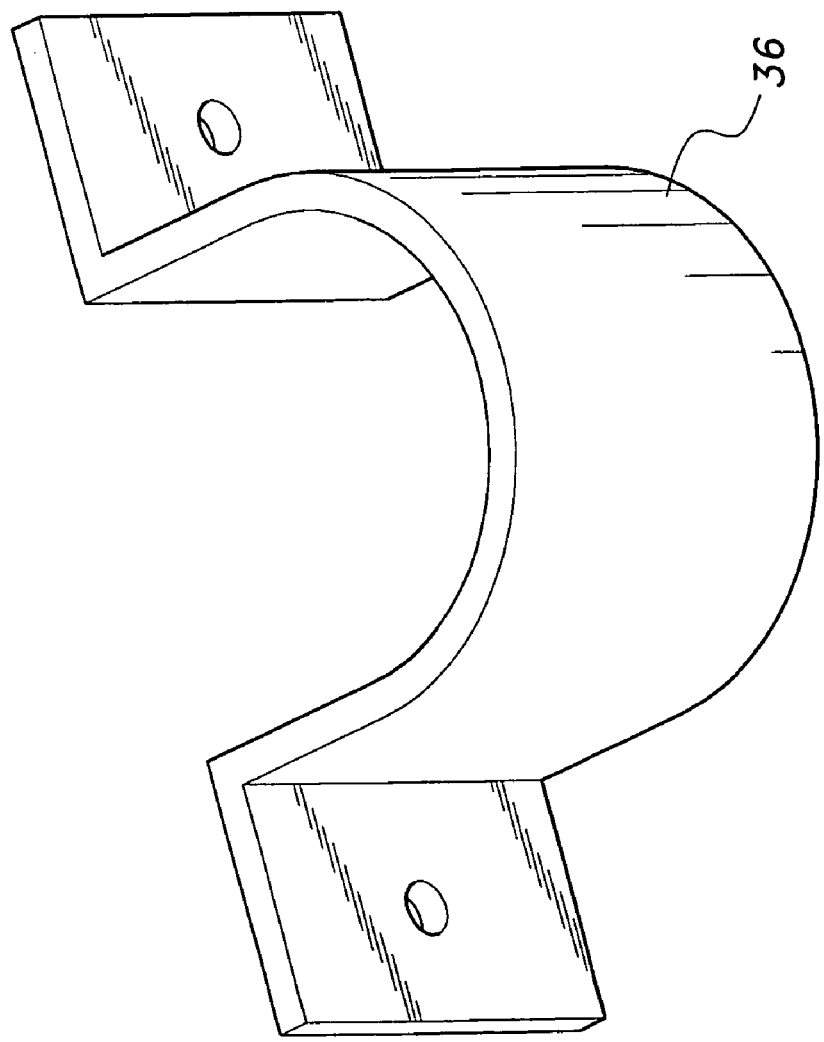
FIG. 2G is a perspective view of one of the connection plates that attach around the two vertical pipes on the ATV and then attach onto side A of the adjustable frame in an all terrain vehicle safety attachment with gas tank holder according to the present invention.

FIG. 1A, FIG. 1B and FIG. 1C illustrate side A of the adjustable frame 7 being attached onto the back end of the ATV 1, with plate 6 on the ATV 1 being bolted onto plate 9 of frame 7. FIG. 1A, FIG. 1B and FIG. 1C show plates 36 wrapping around the vertical pipes 4 and 5 on the ATV 1. Preferably, there are four bolts that are positioned between members 14 and 15 (shown in FIGS. 2A, 2B). FIG. 2B illustrates the two plates 36 bolted onto side A of frame 7 (with a single plate 36 being shown in FIG. 2G).

In FIG. 2B, plates 36 are shown for purposes of clarity as being bolted onto the back side of side A of frame 7. Once plate 9 of the adjustable frame 100 has been attached to the back end of the plate 6 on the ATV 1, and the two plates 36 have been bolted around the two vertical pipes 4 and 5 on the ATV 1 and secured to frame 7, the adjustable frame 100 is secured and ready to attach to the safety device 37.

FIG. 1A, FIG. 1B and FIG. 1C show the safety device 37 attaching onto side B of frame 8, with locking pins 35 being inserted to hold the safety device 37 onto the adjustable frame 7 and 8. FIG. 2D shows the safety device 37 with an exemplary gasoline container 50 housed within its frame. As shown in FIG. 2E, the safety device 37 includes two bottom members 38 and 40 (which secure to members 31, 33, respectively). These members 38 and 40 are made into left/right hand pieces, as shown. As shown in FIG. 2E, member 38 includes three separate portions, with portion 138 extending perpendicularly to vertical member 47 and being adapted for attachment to member 31 of frame 8. Portion 139 projects oppositely from vertical member 47, and is angled outwardly, as shown. End portion 140 is positioned so as align parallel to portion 138, but is angled slightly upwardly.

Similarly, member 40 includes three separate portions, with portion 140 extending perpendicularly to vertical member 48 and being adapted for attachment to member 33 of frame 8. Portion 141 projects oppositely from vertical member 48, and is angled outwardly, as shown. End portion 142 is positioned so as to align parallel to portion 140, but is angled slightly upwardly (parallel with end portion 140). The bent members 38 and 40 are bent to the right and the left to serve the purpose of stability if the ATV 1 tips and has a backward mishap, forming a wide base.

The upwardly bent ends 140, 142 serve two purposes: first, when the ATV 1 is backing up, the bent tips stop the safety device 37 from digging into the ground, and secondly, when the front end of the ATV 1 lifts off the ground, the bent tips 140, 142 contact the ground and act as resting pads before the ATV 1 drops back onto its wheels. A hole is drilled through each of the members 38 and 40 on the opposite end thereof from the bent ends 140, 142, with the locking pins 35 passing through these holes.

Member 39 is beveled at a 45-degree angle on the back end thereof, and the front end thereof is cut square, with a hole drilled therethrough for receiving a locking pin 35. Member 39 also has a central hole drilled through it, in approximately the center of the compartment for carrying the gasoline container 50. This hole is used to tie the gasoline container 50 within the housing defined by the frame members. Similarly, member 47 is beveled at a 45-degree angle at the top end thereof, and is cut square at the bottom end, with the beveled top end mating with the beveled end of member 39. Member 46 is cut square on both ends. Members 38, 46, 39 and 47 join together to form one side of the safety device 37. Members 38, 46, 39 and 47 are welded fully.

The other side of the safety device 37 is built similar to the first side, described above. Member 41 is beveled at a 45-degree angle on the back end thereof, and the front end is cut square with a hole drilled therethrough. A locking pin 35 passes through this hole. Member 41 is similar to member 39, having a central hole drilled through it, in approximately the center of the compartment. This hole is used to tie the other end of the mechanism to hold the gasoline container 50 within the safety device housing. Member 48 is beveled at a 45-degree angle at the top end thereof, and is cut square at the bottom end. Member 49 is cut square on both ends. Members 40, 41, 48 and 49 are secured together to form the other side of the safety device 37. These members are again welded (or otherwise secured) to one another. Both sides of the safety device 37 are secured together by four members horizontal members 42, 43, 44, 45, as shown.

Members 42 and 43 each preferably have a substantially L-shaped cross-sectional contour, with the lower, inner legs thereof facing one another to act as a shelf to carry the bottom of the gasoline container 50. Each end of these members 42 and 43 are attached to either side of the safety device 37 by welding or the like. Member 44 is similarly preferably L-shaped, with the upper leg being positioned horizontally and forward, towards the back end of the ATV 1, with the other leg being positioned vertically on the inside of the compartment to carry the gasoline container 50. Member 45 is preferably planar, as shown.

In FIG. 1A, FIG. 1B and FIG. 1C, the safety device 37 is attached to the B side of frame 8 of adjustable frame 100. The locking pins 35 are inserted through the four locations on the safety device 37 to the adjustable frame 100, on the B side of frame 8. The driver and/or passenger are ready to ride the trails, with the safety device 37 secured.

FIG. 2C illustrates the relatively long, curved threaded bolts 19 and 20, with flat washer 21, lock washer 22 and double nuts 23. To adjust the adjustable frames 7 and 8 of overall frame 100, the double nuts 23 are loosened from the outside of plates 28 and 29 on frame 8. These double nuts 23 are backed off a certain distance. The double nuts 23 on the inside of frame 8, on plates 28 and 29, are loosened off, and then, one by one, the double nuts 23 are tightened up until the desired adjustment angle is achieved. Once the desired adjustment is reached, the nuts on both sides of plates 28 and 29 are tightened. The double nuts 23 on frame 7 do not need to be adjusted. Preferably, bolts 19, 20 will be cut or trimmed at the dealership (i.e., at the point of purchase), allowing the frame to be adjusted only to a pre-determined safe angle. As noted above, the present invention may be applied to a wide variety of vehicles and the length of the bolts will be determined dependent upon the particular vehicle type. Preferably, the dealer will have information previously supplied regarding the safe angles for various types of vehicles. By trimming the bolts so that only a pre-determined safe angle can be attained, accidents caused by allowing too much clearance can be avoided.

Figure 3A:
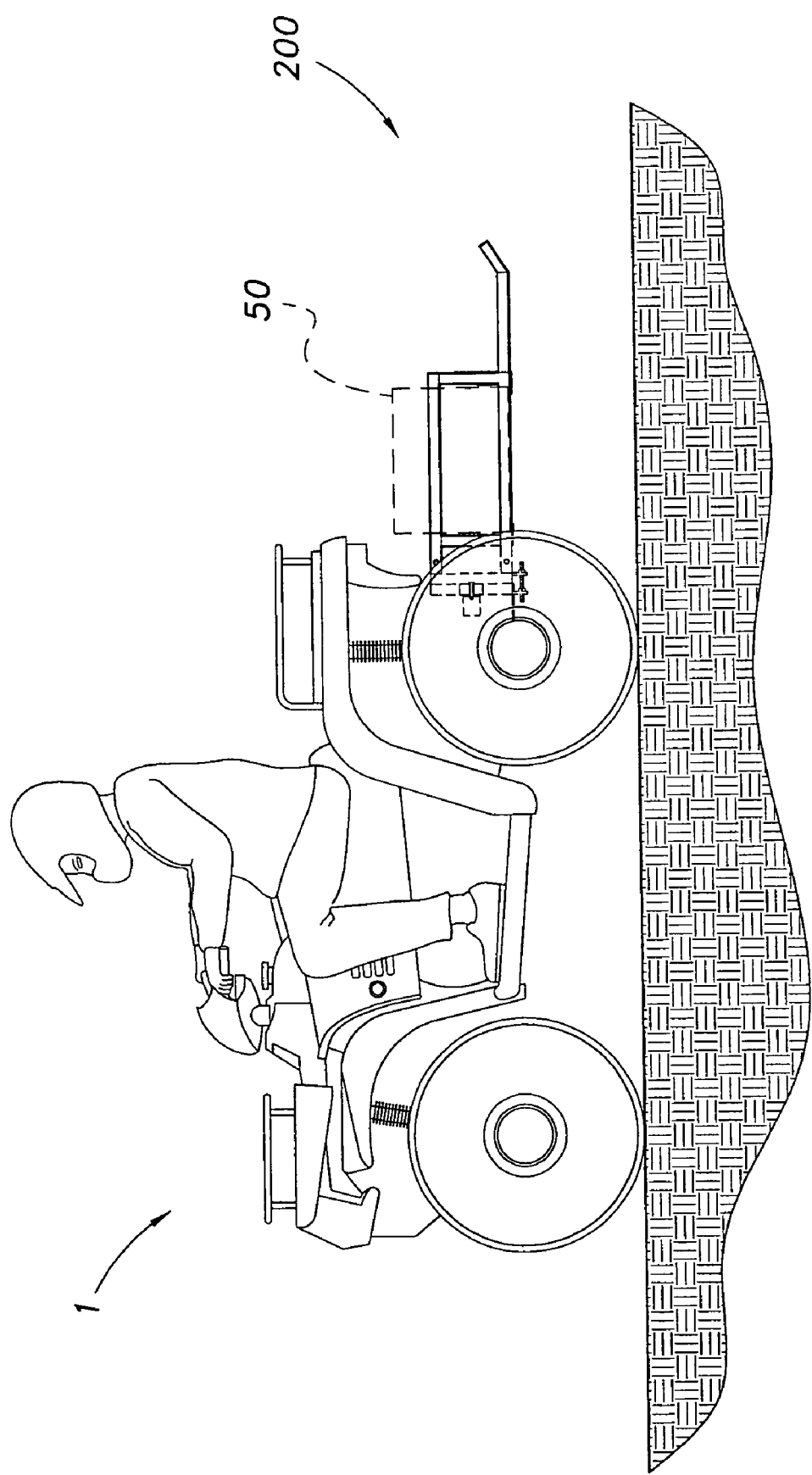
FIG. 3A is an environmental left side view of one person riding a conventional one-person ATV equipped with an all terrain vehicle safety attachment with gas tank holder according to the present invention, the adjustable frame being adjusted to its initial position.
Figure 3B:
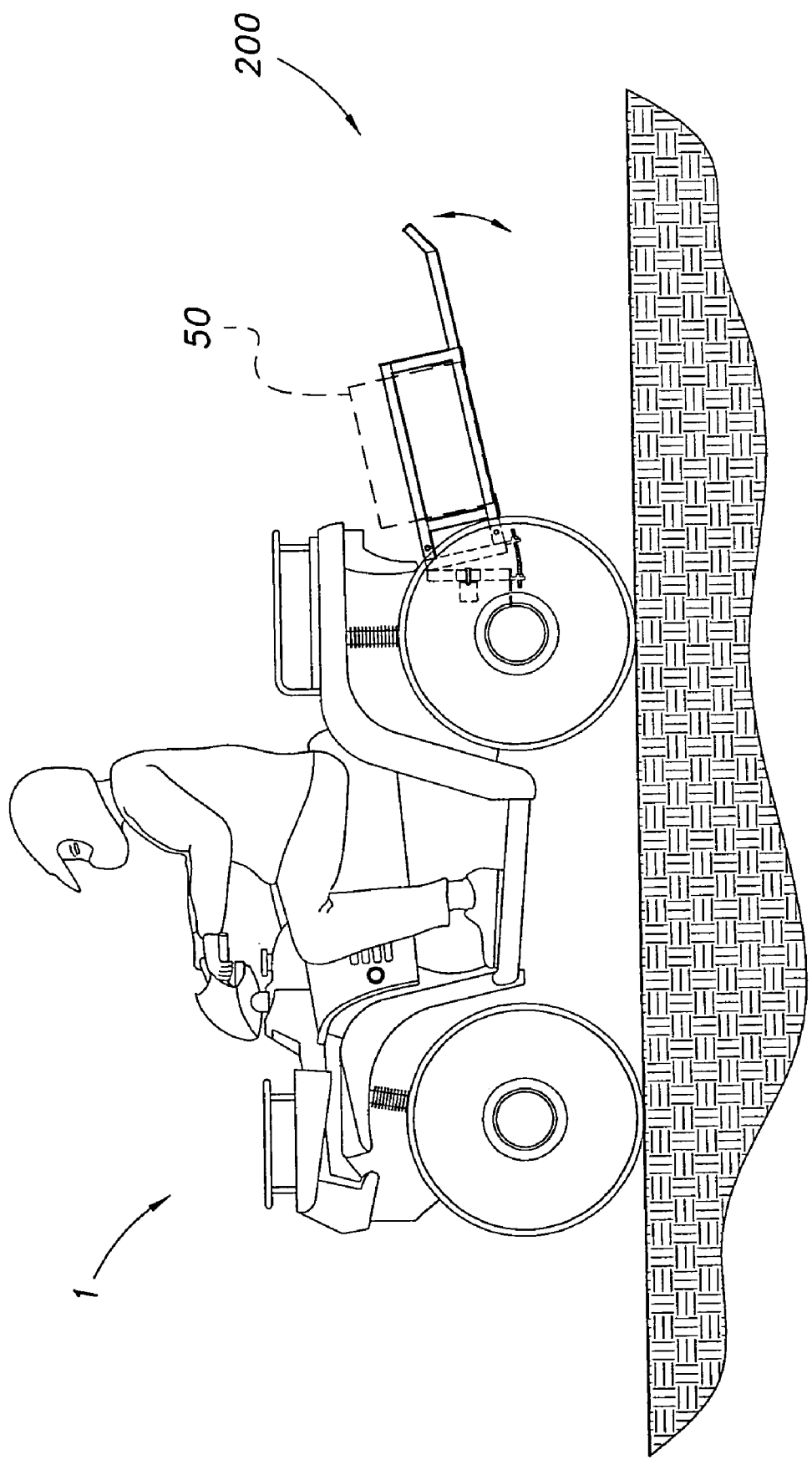
FIG. 3B is an environmental left side view similar to FIG. 3A, but with the adjustable frame adjusted to its maximum safe open position.

FIG. 3A shows a conventional one person ATV 1, though this configuration could also be a two-person ATV driven by one person on a flat surface. The safety attachment 200 is attached thereto and is adjusted to its closed position for flat ground. With the safety attachment 200 secured on the back of the ATV 1, if the front end lifts off the ground to an unsafe degree for any reason, the driver would be protected from the ATV 1 tipping over backwards. In FIG. 3B the safety attachment 200 is attached to ATV 1 and is angularly adjusted to its fully open position. If the front end of ATV 1 lifts off the ground for any reason, the driver will be protected from a backwards flip-over. If the terrain begins to get rough or hilly, the safety attachment 200 will not touch the terrain, as it is raised, as shown.

Figure 4A:
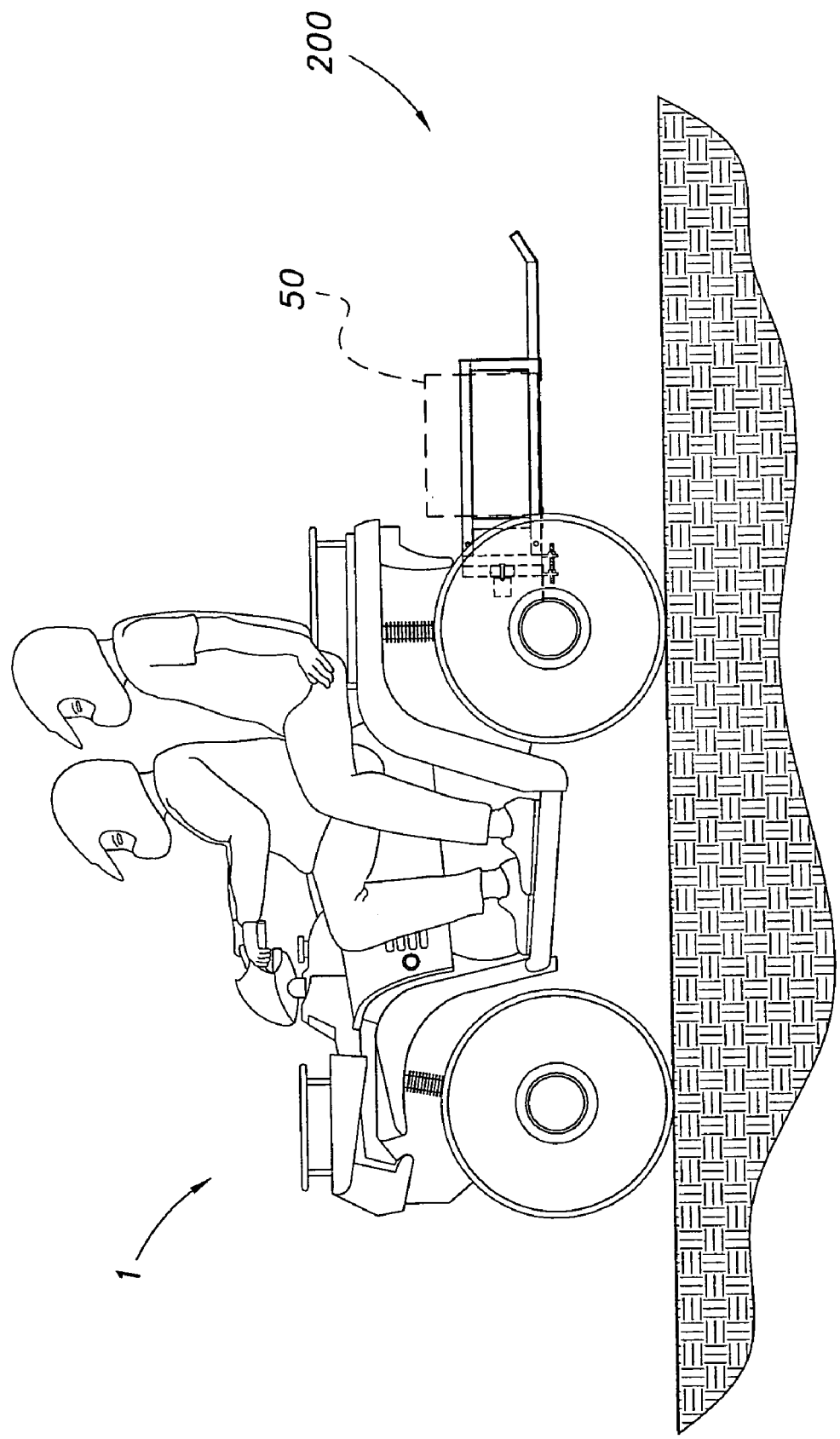
FIG. 4A is an environmental left side view of a driver and a passenger riding a conventional one-person ATV equipped with an all terrain vehicle safety attachment with gas tank holder according to the present invention, the adjustable frame being adjusted to its initial position.
Figure 4B:
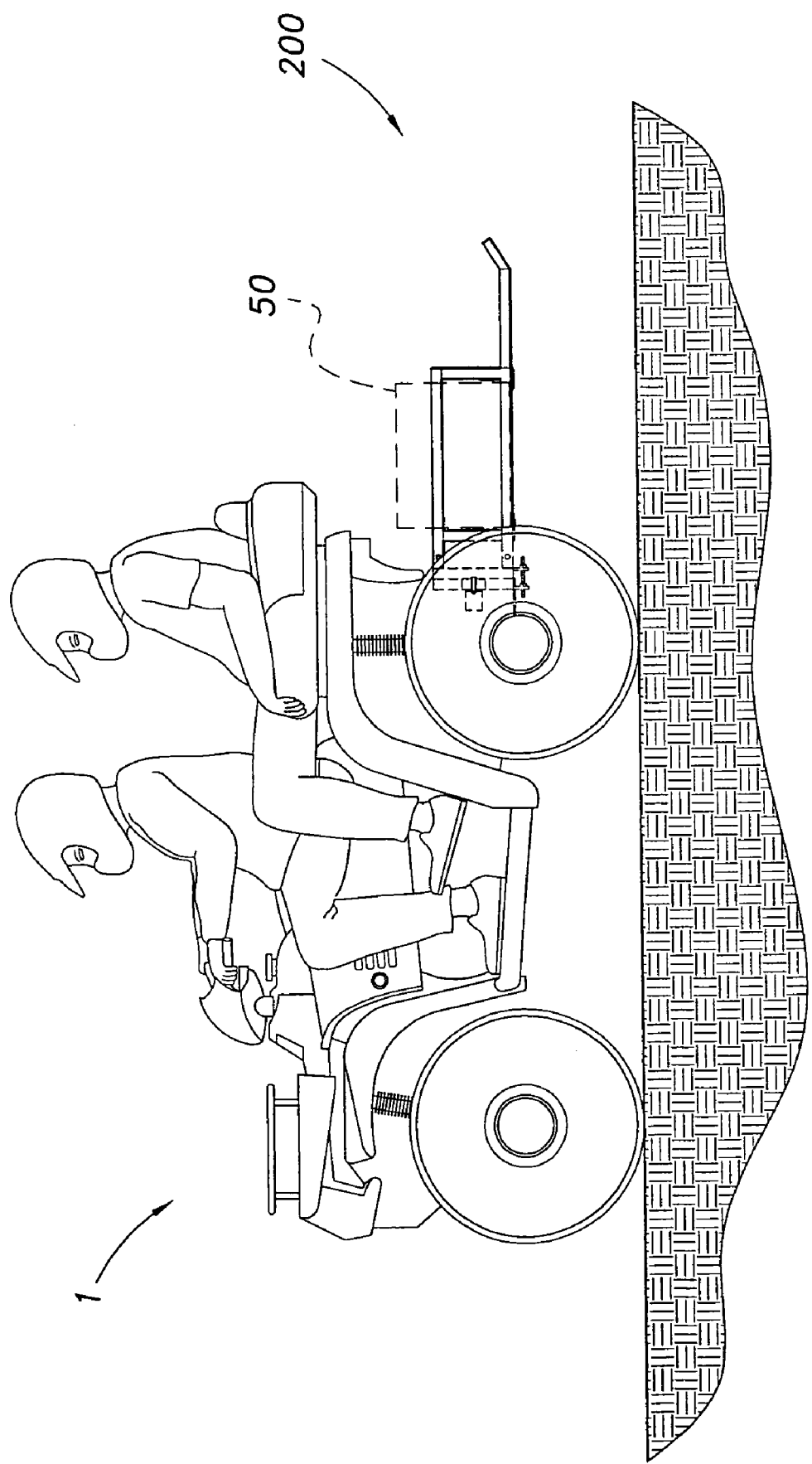
FIG. 4B is an environmental left side view of a driver and a passenger riding a conventional one-person ATV equipped with a conventional after-market passenger seat, and with an all terrain vehicle safety attachment with gas tank holder according to the present invention, the adjustable frame being adjusted to its initial position.

FIG. 4A shows a driver and a passenger riding a conventional ATV 1, with the center of the passenger's body being almost right on top of the center of the back wheels. The safety attachment 200 is adjusted to its closed position and the terrain is flat. If the ATV encounters any uneven terrain that could result in an overturn of the ATV 1, the safety attachment 200 will keep the driver and the passenger safe. If this vehicle was a two person ATV, the passenger would sit further forward, away from the center of the rear wheels, but still a mishap could occur if the terrain changes from flat to hilly. FIG. 4B shows a driver and a passenger riding a conventional ATV with an after-market back seat. The passenger's center of body is past the center of the rear wheels, resulting in the front end being lighter than the ATV without an after-market back seat. Without the safety attachment 200 attached to the ATV 1, a mishap is likely to occur once the ATV leaves flat terrain.

Figure 5A:
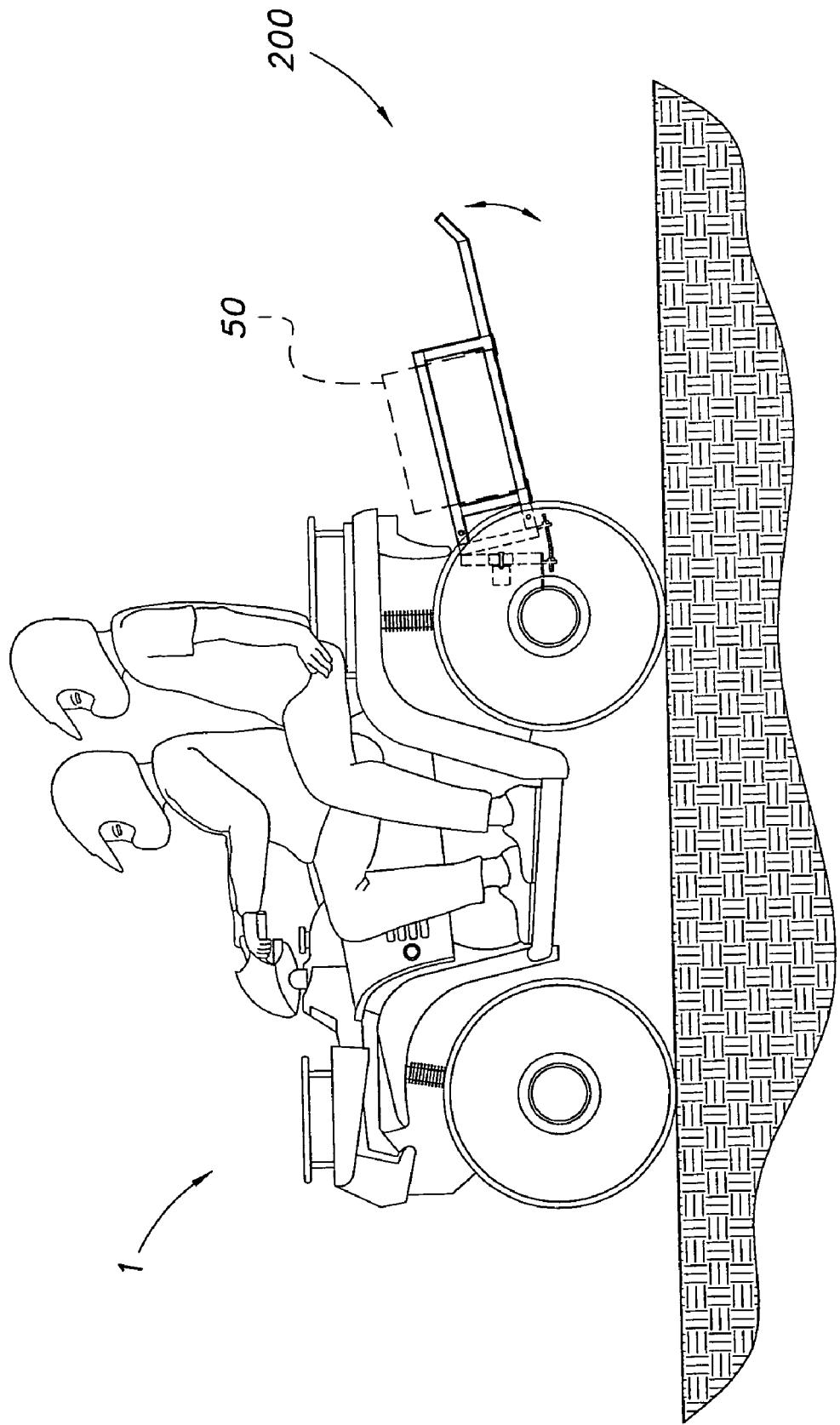
FIG. 5A is an environmental left side view similar to FIG. 4A, but with the adjustable frame adjusted to its maximum safe open position.
Figure 5B:
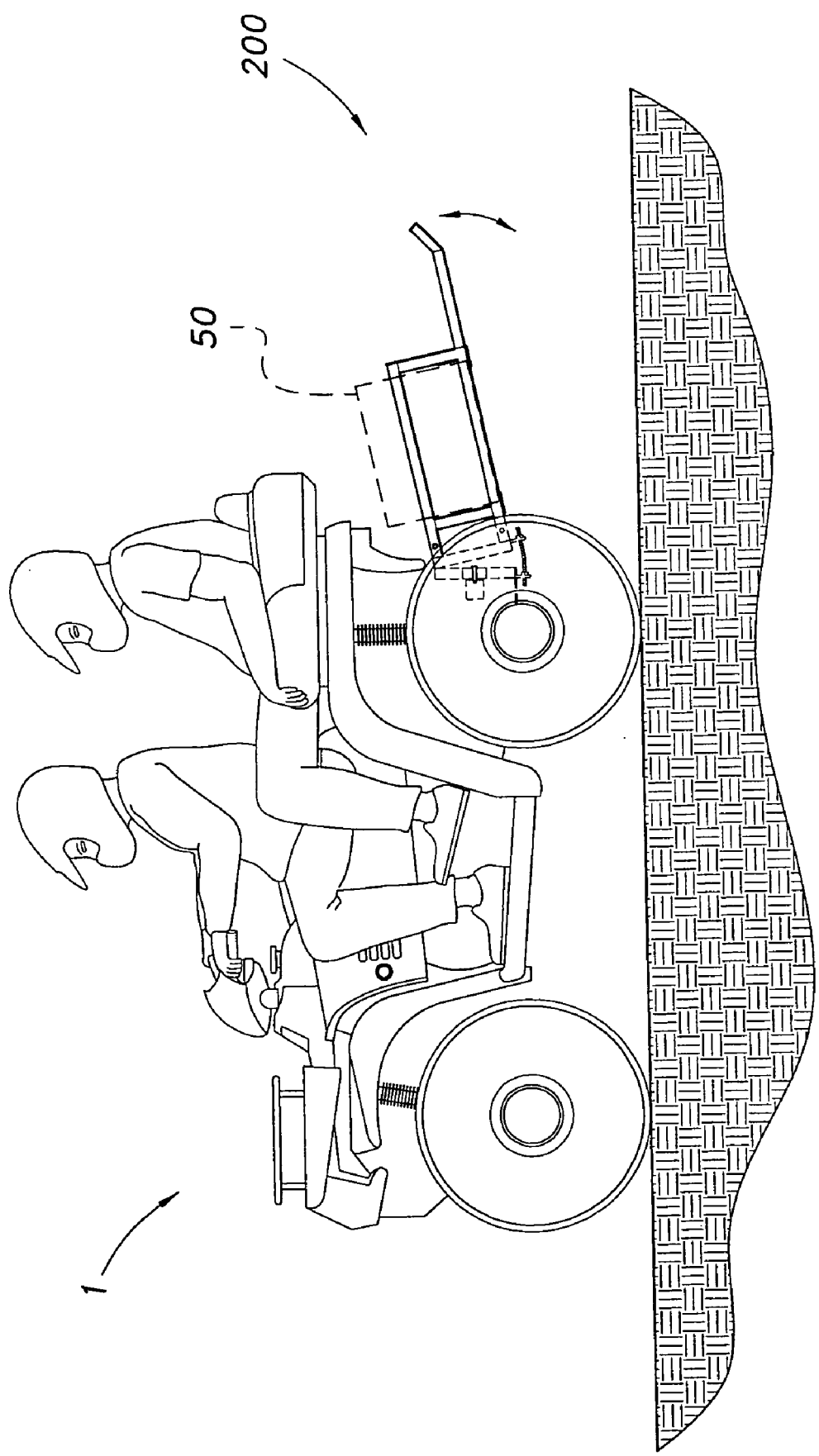
FIG. 5B is an environmental left side view similar to FIG. 4B, but with the adjustable frame adjusted to its maximum safe open position.
Figure 6A:
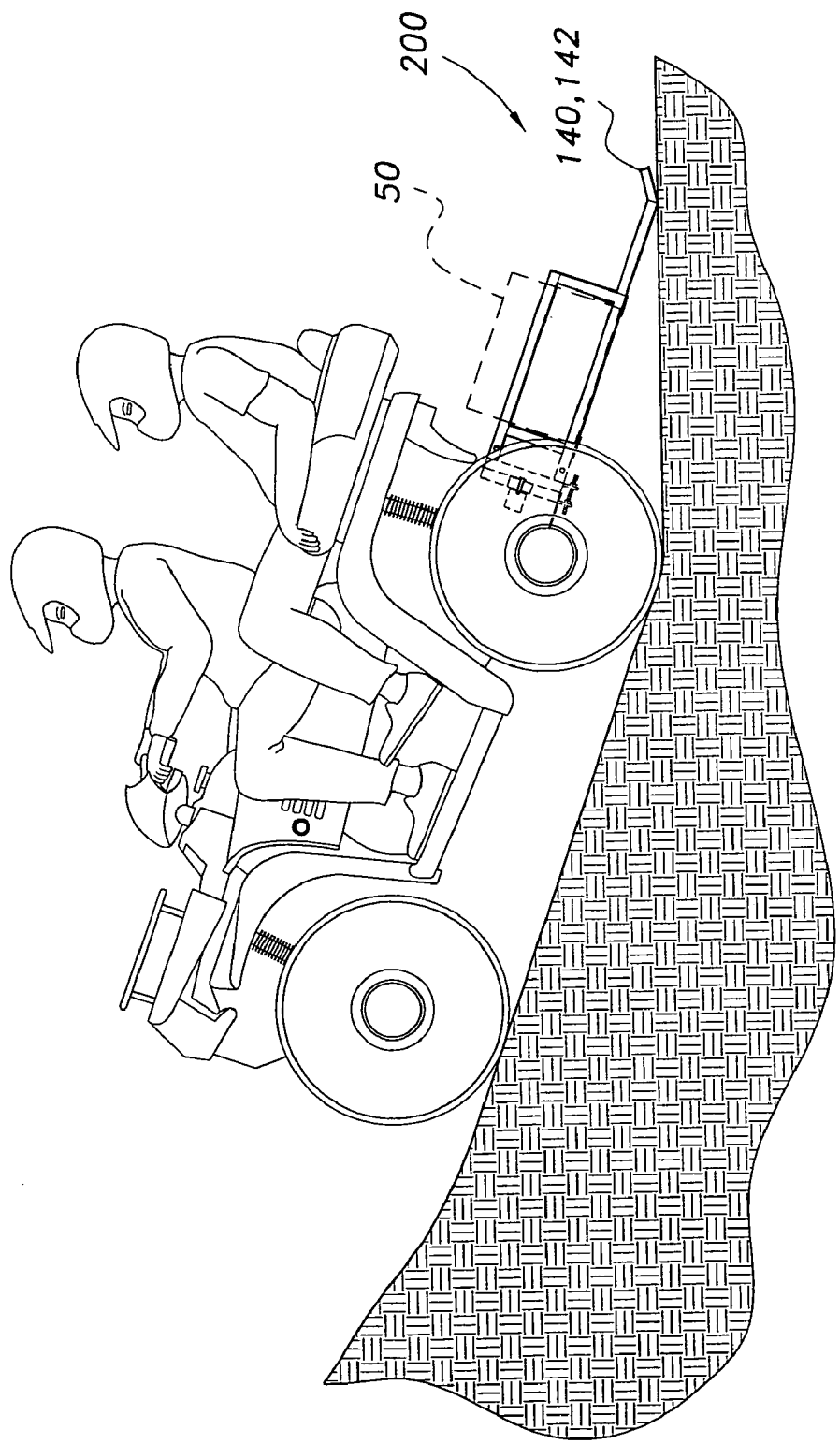
FIG. 6A is an environmental left side view of a driver and a passenger riding a conventional one-person ATV equipped with an after-market passenger seat and with an all terrain vehicle safety attachment with gas tank holder according to the present invention, shown adjusted at the initial position and climbing up a fairly steep hill.
Figure 6B:
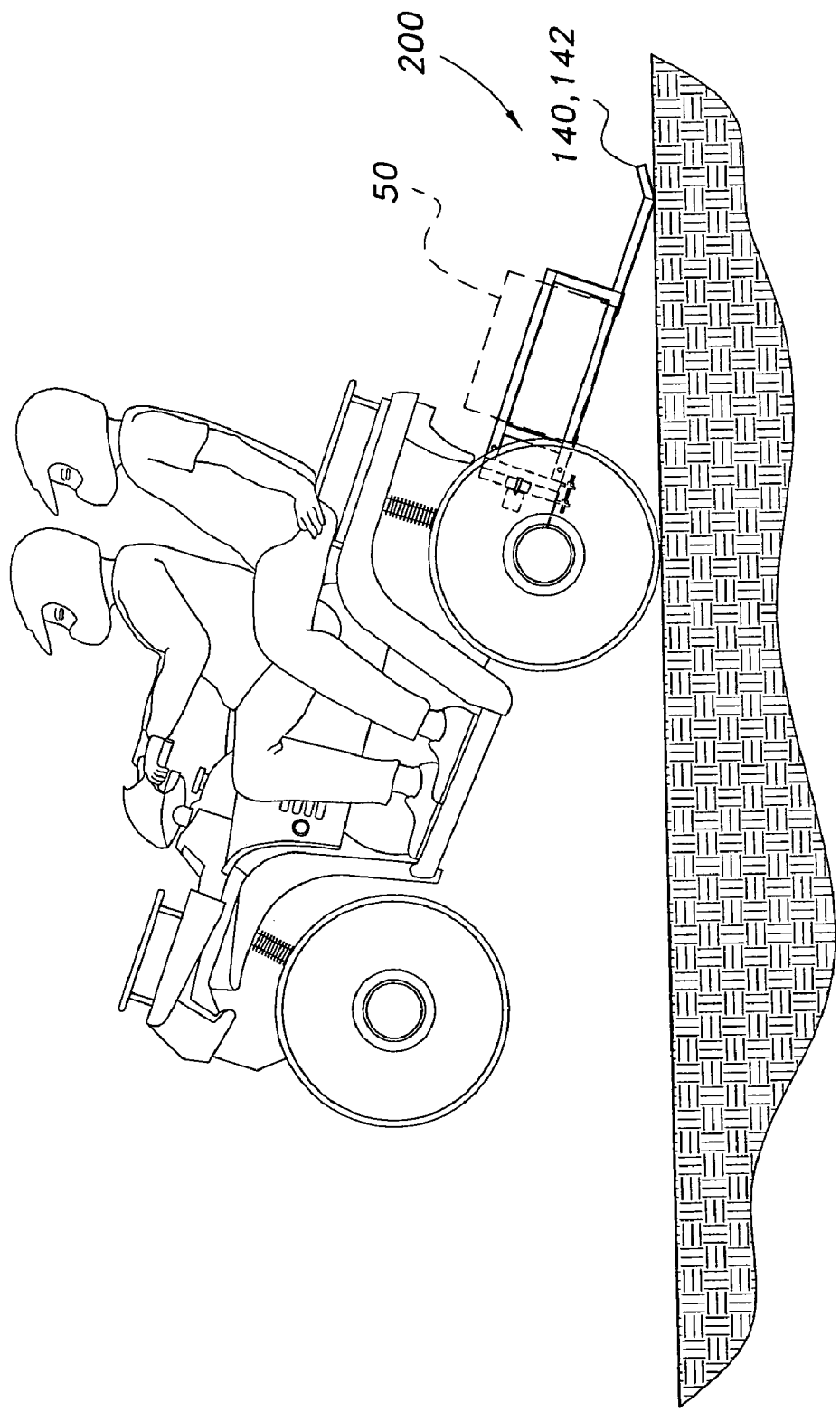
FIG. 6B is an environmental left side view of a driver and a passenger riding a conventional one-person ATV equipped with an all terrain vehicle safety attachment with gas tank holder according to the present invention, illustrating that due to the extra person and the power of the ATV, the front end of the ATV is lifted off the ground on a fast take-off.

FIG. 5A and FIG. 5B are similar to the previous FIG. 4A and FIG. 4B, but safety attachment 200 is shown as angularly adjusted to its fully open position. FIG. 6A shows a driver and a passenger riding a conventional one-person ATV 1 with an after-market back seat, and with the safety attachment 200 in its closed position, climbing a reasonable incline. Sudden changes on the incline could result in an overturn. Also, backing down an incline and rapidly applying the brakes in the situation shown could cause the front end of ATV 1 to lift off the ground. Without safety attachment 200 secured to the rear of the ATV 1, a backwards mishap would occur. As shown, the rear ends 140, 142 form a wide contact base for supporting the ATV 1, thus preventing an accidental tip. FIG. 6B shows a driver and a passenger riding a conventional one-person ATV with the safety attachment 200 in the closed position. The terrain is flat, but accelerating too fast could cause the front end of ATV 1 to lift off the ground, and a mishap would occur without the safety attachment 200. As in FIG. 6A, the rear ends 140, 142 act as a base for supporting ATV 1 when it the vehicle is tipped with the front end thereof angled with respect to the ground.

Figure 7A:
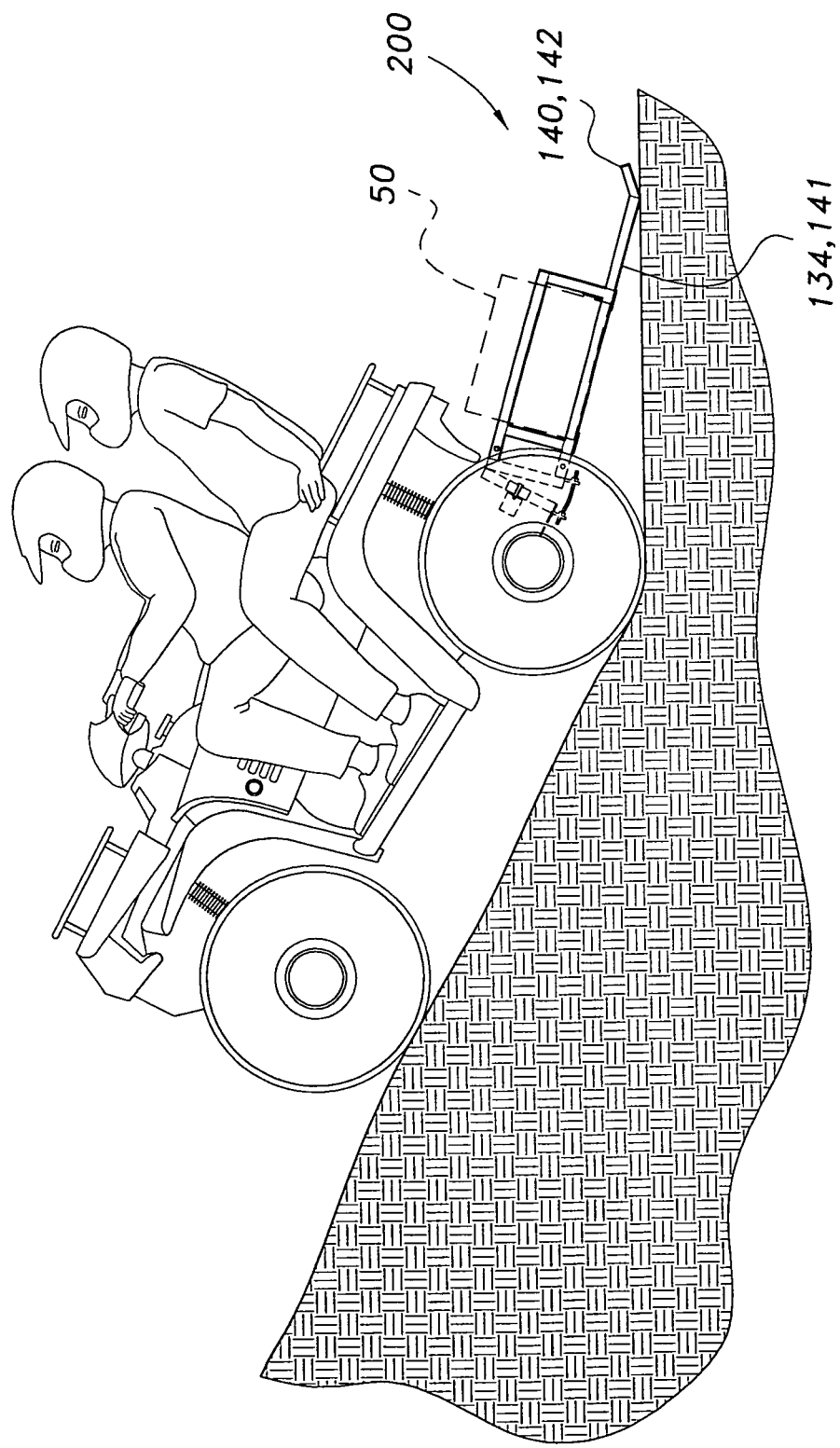
FIG. 7A is an environmental left side view of a driver and a passenger riding a conventional one-person ATV equipped with an all terrain vehicle safety attachment with gas tank holder according to the present invention adjusted to its maximum safe open position, illustrating that on the start of a steep hill, the ATV tends to flip up, but the safety attachment stops the ATV from going over backwards.
Figure 7B:
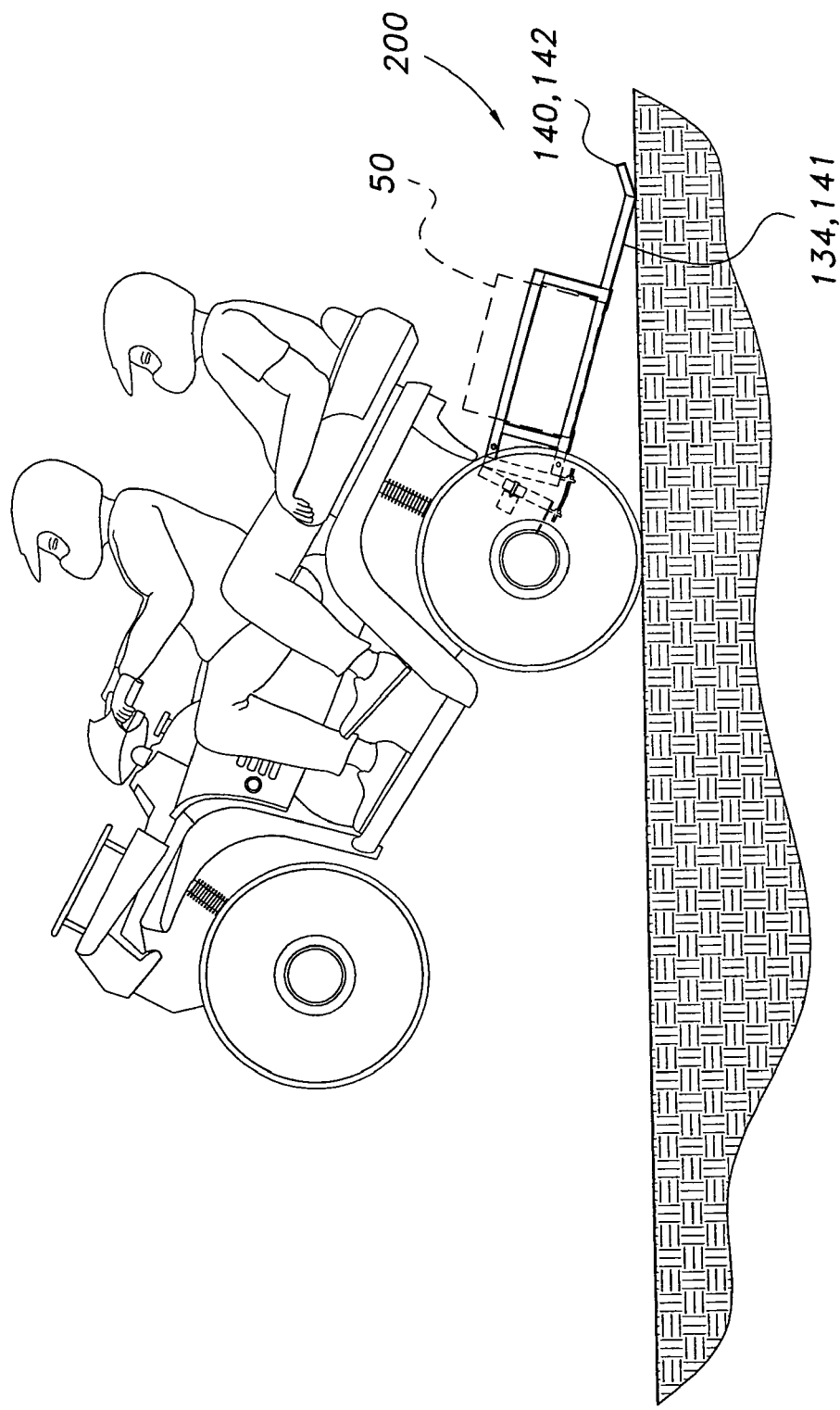
FIG. 7B is an environmental left side view of a driver and a passenger riding a conventional one-person ATV equipped with an after-market passenger seat and with an all terrain vehicle safety attachment with gas tank holder according to the present invention adjusted to its maximum safe open position, illustrating that with the extra person and the power of the ATV, the front end of the ATV lifts off the ground on a fast take-off.

FIG. 7A shows a driver and a passenger riding a conventional one-person ATV with the safety attachment 200 in the fully open position and the terrain has a steep incline. At such a steep incline, the ends 140, 142 may slightly contact the ground when going up a steep incline. Once the ATV 1 starts climbing the steep incline, the tips 140, 142 of the safety device 200 will clear the ground, unless there is a sudden change in incline and the front end lifts off the ground, and again the safety attachment tips 140 142 are required. FIG. 7B shows a driver and a passenger riding a conventional one-person ATV with an after-market back seat, with the safety attachment 200 in its fully open position. The center of the passenger's body is behind the center of the rear wheels, and the front end of the ATV is somewhat lighter, thus the ATV's power is too much for the weight of the ATV and the front end lifts off the ground. The ends 140, 142, acting as a support base, prevent a mishap from occurring.

Figure 7C:
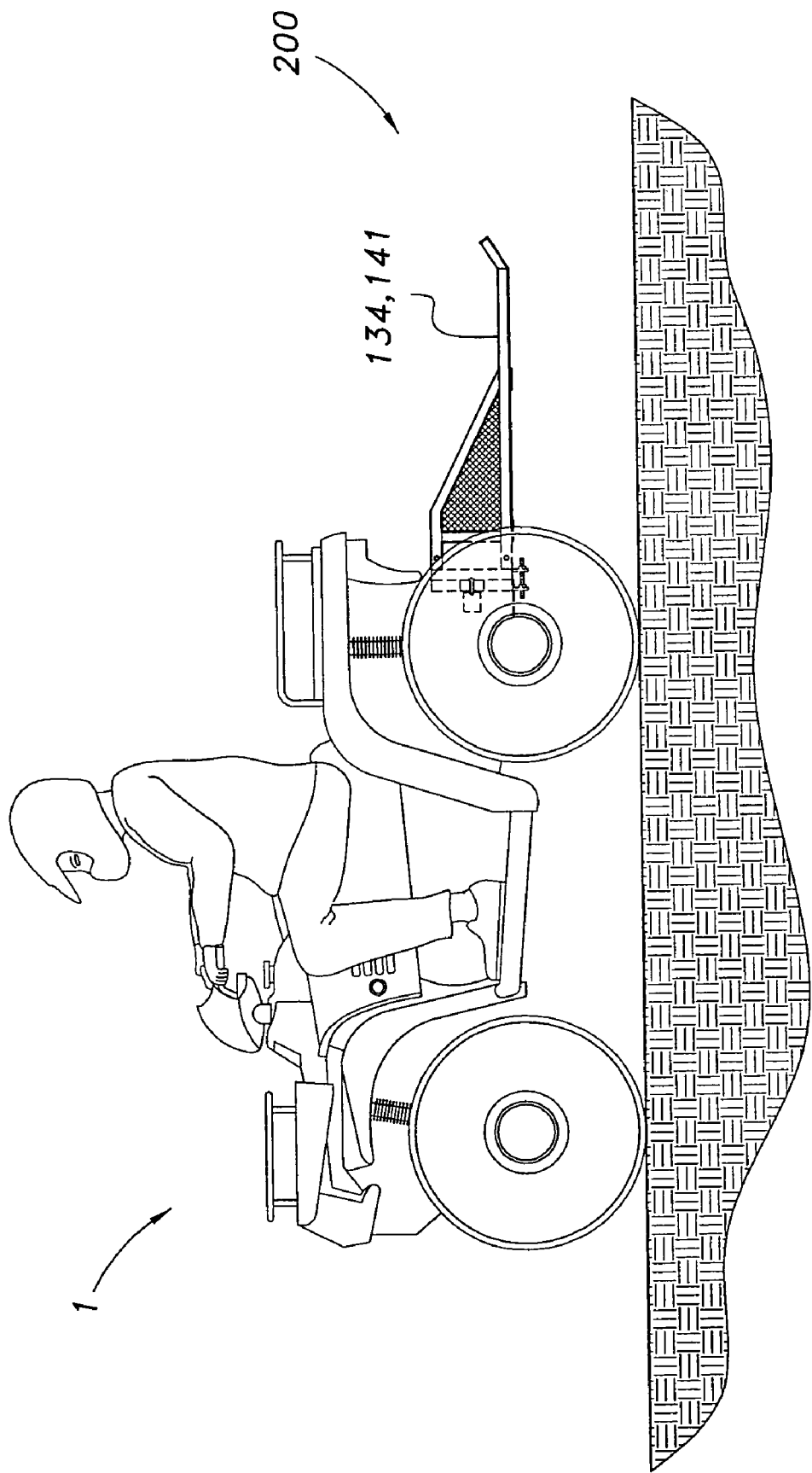
FIG. 7C is an environmental side view of an alternative embodiment of an all terrain vehicle safety attachment according to the present invention.

In the embodiment illustrated in FIG. 7C, the portions 139, 141 are shown as being angled in the initial position, rather than being positioned horizontally. It should be understood that portions 139, 141 (or the overall members 38, 40) may have any desired dimension, configuration, or orientation, depending upon the particular needs of the user and the nature of the terrain.

In the alternative embodiment of FIG. 8A, the angled portions 139, 141 may be applied to the safety attachment 200 and, as shown, the plate 9 now has a single opening formed therethrough (as opposed to the pair of openings in FIG. 1A), for attachment to plate 6, mounted on the back end of ATV 1 via bolts or the like. It should be understood that any suitable type of attachment may be used for securing the adjustable frame 100 to the back end of ATV 1. Additionally, a pair of openings 204 are formed through horizontal member 43 of safety device 37, allowing for the attachment of a separate trailer hitch 202, with trailer hitch 202 being secured to member 43 by bolts or the like. It should be understood that any suitable type of attachment may be used for securing trailer hitch 202 to the safety device 37. It should be noted that trailer hitch 202 has the same contouring and dimensions of hitch plate 34, though hitch plate 34 is preferably welded to the frame.

Further, in the embodiment of FIG. 8A, a pair of horizontally extending landing plates 206 have been respectively secured to the angled ends 140, 142 of safety device 37, thus creating a wider support surface when the ATV 1 tips and rests on the angled ends 140, 142.

Figure 8B:
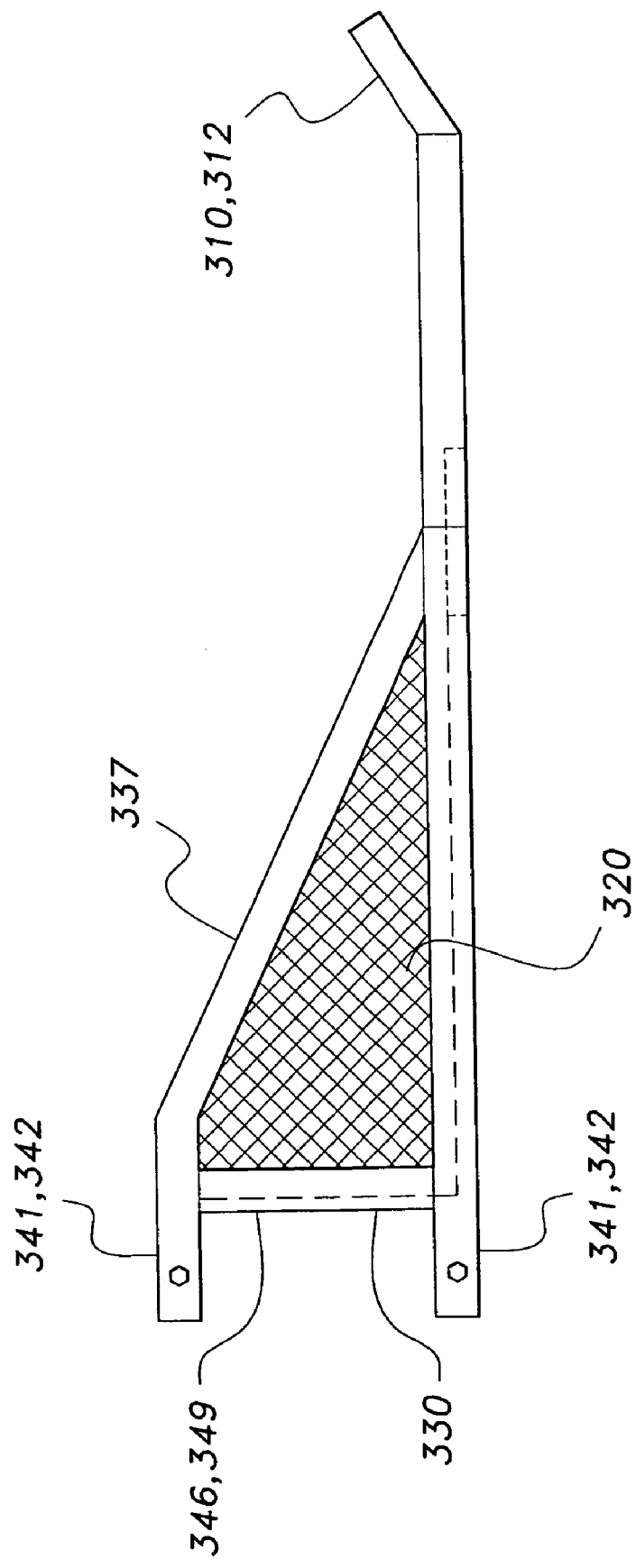
FIG. 8B is a side view of another alternative embodiment of an all terrain vehicle safety attachment according to the present invention.

In the alternative embodiment illustrated in FIGS. 8B and 8C, safety device 337 is similar to safety device 37. However, the upper members 341, 342 each have angled portions (as opposed to the linear contouring of members 41, 42), thus removing the necessity of vertical members 47, 48. Lower members 338, 340 are similar to the lower members 38, 40. However, it should be noted that mesh screens 320 have been secured within the trapezoidal boundaries defined by lower members 338, 340, and their respective adjacent vertical members 346, 349, and corresponding upper members 341, 342. Additionally, a mesh screen 330 may inserted between members 346, 349 (corresponding to members 46, 49), and as shown in FIG. 8C, another mesh screen 324 may also be inserted in the lower portion of the gasoline can compartment, thus defining an enclosed compartment for reception of gasoline can 50.

Further, as best shown in FIG. 8C, landing plates 306, similar to landing plates 206, are secured to ends 310, 312 of members 338, 340, respectively. Further, each end 310, 312 has an opening formed therethrough for attachment to an external loading bar 322, as shown. Additionally, openings may be formed through member 343, similar to that described above with reference to member 43, for attachment to a trailer hitch 302.

Figure 9:
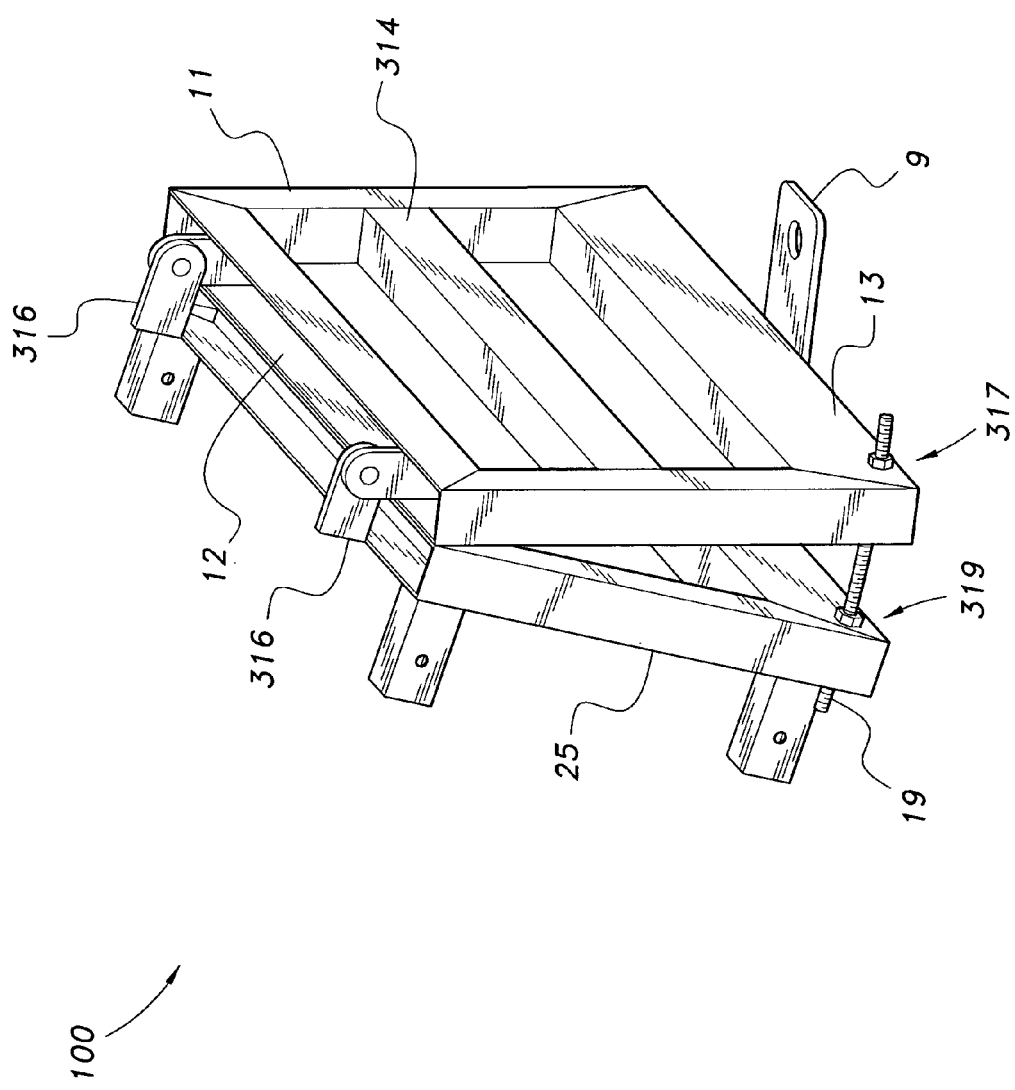
FIG. 9 is a perspective view of an alternative embodiment of an adjustable frame for an all terrain vehicle safety attachment according to the present invention.

In the alternative embodiment shown in FIG. 9, the adjustable frame 100 is similar to that shown in FIG. 2A. However, only a single, relatively long curved threaded bolt 19 is now utilized (i.e., bolt 20 has been removed). Rather than passing through plates 17, 29, bores 317, 319 are now formed through the lower portions of members 10, 25, respectively. The bolt 19 passes through the bores 317, 319. Additionally, the single opening of FIG. 8A, formed through plate 9, is shown in this embodiment, and hinge 16 of FIG. 3A has been replaced by a pair of hinge plates 316. Further, it should be noted that the pairs of horizontal members 14, 15 have been replaced by a single horizontal member 314.

Figure 10:
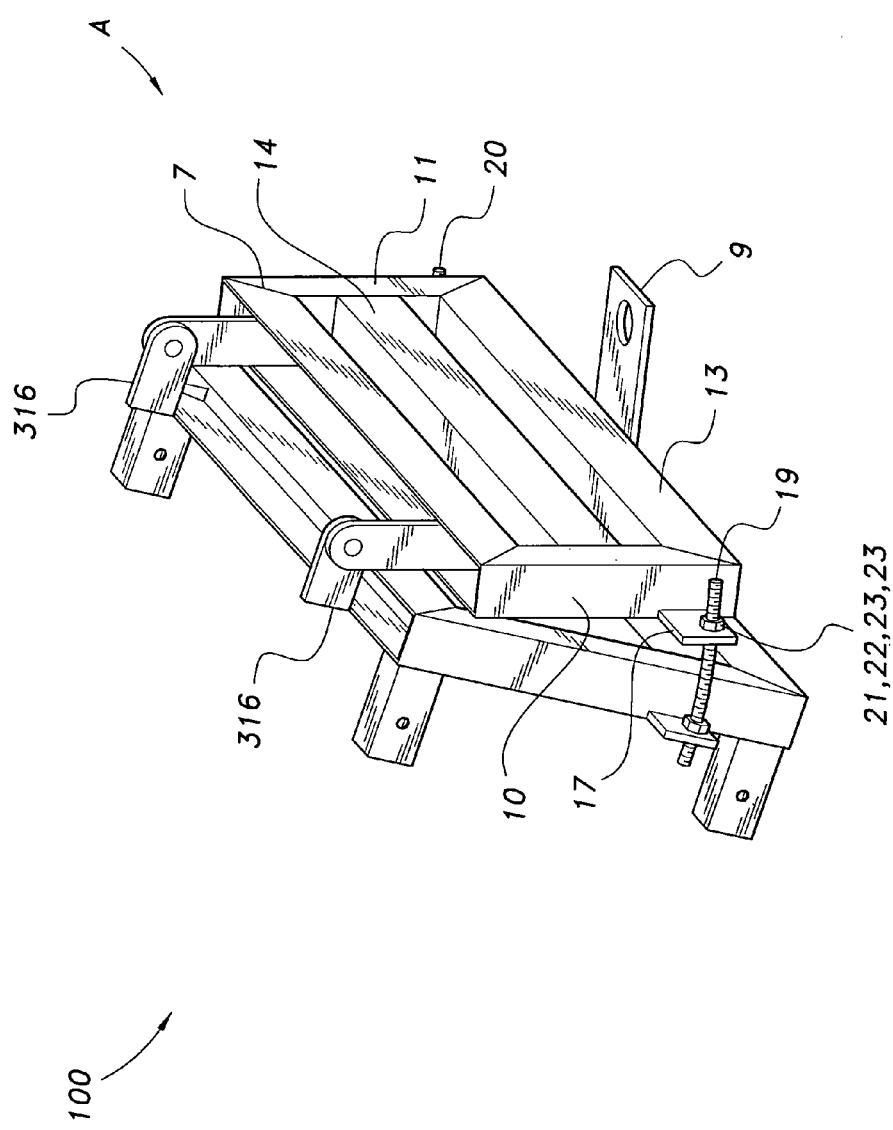
FIG. 10 is a perspective view of side A of an alternative embodiment of the adjustable frame of an all terrain vehicle safety attachment with gas tank holder of FIG. 2A.

FIG. 10 illustrates an alternative embodiment of frame 100 of FIGS. 2A, 2B. In FIG. 10, plates 17 have been moved to the sides of the respective frame members, as shown, rather than projecting downwardly. Further, as shown, frame member 7 is now decreased in height, relative to frame member 8, thus requiring bolts 19, 20 to be located more centrally with respect to the pair of frame members. This spacing allows for easier adjustment of the bolts and associated nuts and washers. The hinge plates 316 of FIG. 9 are also utilized in FIG. 10.

It is to be understood that the present invention is not limited to the embodiments described above, but encompasses any and all embodiments within the scope of the following claims.

I claim:

1. An all terrain vehicle safety attachment, comprising:
an adjustable frame having first and second frame portions, the first and second frame portions having upper ends pivotally attached to one another;
means for selectively adjusting an angular deviation between the first and second frame portions;
means for securing the first frame portion to a back end of a vehicle;
a safety device having a pair of spaced apart, lower horizontal members, each of the lower horizontal members having a front portion, a central portion and a rear portion, the rear portions thereof being angled upwardly, whereby the rear portions form a support base for the vehicle when a front end of the vehicle tips off the ground; and
means for securing the safety device to the second frame portion.

2. The all terrain vehicle safety attachment as recited in claim 1, wherein the front portions of said lower horizontal members are positioned parallel with respect to one another, the central portions thereof being angled outwardly, away from one another, and the rear portions thereof being positioned parallel with respect to one another and with respect to the front portions.

3. The all terrain vehicle safety attachment as recited in claim 2, wherein said safety device further comprises a pair of upper horizontal members positioned above and extending parallel to the pair of lower horizontal members, the pair of upper horizontal members and the pair of lower horizontal members defining a space therebetween adapted for receiving a gasoline container.

4. The all terrain vehicle safety attachment as recited in claim 3, wherein the upper horizontal members and the lower horizontal members have front portions releasably attached to the second frame portion of the adjustable frame.

5. The all terrain vehicle safety attachment as recited in claim 4, wherein said safety device further comprises a pair of lower crossmembers attached to and extending between the central portions of the lower horizontal members.

6. The all terrain vehicle safety attachment as recited in claim 5, wherein said safety device further comprises a pair of upper crossmembers aligned with the pair of lower crossmembers, the upper crossmembers being attached to and extending between the upper horizontal members.

7. The all terrain vehicle safety attachment as recited in claim 6, further comprising a trailer hitch attached to said safety device.

8. The all terrain vehicle safety attachment as recited in claim 5, further comprising a pair of landing plates, each of the landing plates being attached to a respective one of the rear portions of the lower horizontal members.

9. The all terrain vehicle safety attachment as recited in claim 4, wherein said second frame portion is substantially rectangular, defining four corners, a connecting member being mounted to each of the corners and extending outwardly therefrom, the front portions of the upper horizontal members and the front portions of the lower horizontal members being releasably attached to the connecting members of the second frame portion.

10. The all terrain vehicle safety attachment as recited in claim 9, wherein said first and second frame portions each have at least one plate mounted to a lower edge thereof, each of the at least one plates having an opening formed therethrough.

11. The all terrain vehicle safety attachment as recited in claim 10, wherein said means for selectively adjusting the angular deviation between said first and second frame portions comprises at least one curved bolt extending through the openings formed through each said at least one plate.

12. The all terrain vehicle safety attachment as recited in claim 9, wherein said means for selectively adjusting the angular deviation between said first and second frame portions comprises at least one curved bolt extending through bores formed through lower ends of said first and second frame portions.

13. The all terrain vehicle safety attachment as recited in claim 9, further comprising a trailer hitch attached to said second frame portion.

14. The all terrain vehicle safety attachment as recited in claim 9, wherein said means for attaching said first frame portion to the back end of the vehicle comprises a connecting plate having at least one opening formed therethrough, the connecting plate being attached to a lower edge of said first frame portion, said connecting plate being adapted for attachment to a mounting plate mounted on the back end of the vehicle.

15. The all terrain vehicle safety attachment as recited in claim 14, further comprising at least one crossbeam mounted to, and extending across, said first frame portion.

16. The all terrain vehicle safety attachment as recited in claim 15, further comprising at least one attachment plate attached to the at least one crossbeam, the at least one attachment plate being adapted for attachment about at least one vertical pipe mounted on the back end of the vehicle.

17. An all terrain vehicle safety attachment, comprising:
an adjustable frame having first and second frame portions, the first and second frame portions having upper ends pivotally attached to one another;
means for selectively adjusting angular deviation between the first and second frame portions;
means for attaching the first frame portion to a back end of a vehicle;
a safety device having a pair of spaced apart lower horizontal members, each of the lower horizontal members having a front portion, a central portion and a rear portion, whereby the rear portions form a support base for the vehicle when a front end of the vehicle tips off the ground; and
means for securing the safety device to the second frame portion.

18. The all terrain vehicle safety attachment as recited in claim 17, wherein the rear portions of the lower horizontal members are each angled upwardly.

19. The all terrain vehicle safety attachment as recited in claim 18, wherein the front portions of said lower horizontal members are positioned parallel with respect to one another, the central portions thereof being angled outwardly, away from one another, and the rear portions thereof being positioned parallel with respect to one another and with respect to the front portions.

20. The all terrain vehicle safety attachment as recited in claim 19, wherein said safety device further comprises a pair of upper horizontal members positioned above, and extending parallel to, the pair of lower horizontal members, the pair of upper horizontal members and the pair of lower horizontal members defining a space therebetween adapted for receiving a gasoline container.

* * * * *